(12) United States Patent
Zhou et al.

(10) Patent No.: US 12,474,041 B2
(45) Date of Patent: Nov. 18, 2025

(54) LIGHTING DEVICE

(71) Applicant: Shenzhen Leqi Innovation Co., Ltd., Shenzhen (CN)

(72) Inventors: Feng Zhou, Shenzhen (CN); Keman Yan, Shenzhen (CN); Nan Qi, Shenzhen (CN); Feng Qin, Shenzhen (CN)

(73) Assignee: SHENZHEN LEQI INNOVATION CO., LTD., Shenzhen (CN)

( * ) Notice: Subject to any disclaimer, the term of this patent is extended or adjusted under 35 U.S.C. 154(b) by 0 days.

(21) Appl. No.: 18/894,015

(22) Filed: Sep. 24, 2024

(65) Prior Publication Data
US 2025/0305672 A1    Oct. 2, 2025

(30) Foreign Application Priority Data

Mar. 29, 2024  (CN) .......................... 202420639207.2
Mar. 29, 2024  (CN) .......................... 202420657127.X
(Continued)

(51) Int. Cl.
*F21V 33/00*  (2006.01)
*F21V 21/14*  (2006.01)
(Continued)

(52) U.S. Cl.
CPC ........ *F21V 33/0052* (2013.01); *F21V 21/145* (2013.01); *F21V 21/406* (2013.01);
(Continued)

(58) Field of Classification Search
CPC .. F21V 33/0052; F21V 21/145; F21V 21/406; F21V 21/116; F21V 23/0414;
(Continued)

(56) References Cited

U.S. PATENT DOCUMENTS 5,697,695 A * 12/1997 Lin ........................... F21L 4/02
                                                                        362/184
11,396,984 B1 * 7/2022 Chao ........................ F21L 4/02
(Continued)

FOREIGN PATENT DOCUMENTS

CN    204420518 U  *  6/2015
CN    105508931 A  *  4/2016
(Continued)

*Primary Examiner* — Erin Kryukova
(74) *Attorney, Agent, or Firm* — Andrew C. Cheng

(57) ABSTRACT

A lighting device includes a light stick, a light-emitting member arranged on one side of the light stick, and a panel mechanism arranged on an opposite side of the light stick. The panel mechanism includes a panel body and a control unit. The panel body is fixedly connected to the light stick. The panel body includes a first connection portion for connecting with external photographic equipment. The control unit is arranged on the panel body and electrically connected with the light-emitting member to control operation status of the light-emitting member. The present application provides an arrangement of the light stick, the light-emitting member, and the panel mechanism, which is easy to assemble and operate. While meeting the needs of outdoor/indoor light filling or other photography requirements, the connection between the lighting device of the application and external photographic equipment, such as a tripod head, is more convenient and more efficient.

18 Claims, 18 Drawing Sheets

(30) Foreign Application Priority Data

Mar. 29, 2024 (CN) .......................... 202420667486.3
Mar. 29, 2024 (CN) .......................... 202430172128.0

(51) Int. Cl.
*F21V 21/40* (2006.01)
*F21V 23/04* (2006.01)
*F21Y 115/10* (2016.01)
*G03B 15/02* (2021.01)

(52) U.S. Cl.
CPC .......... *F21V 23/0414* (2013.01); *G03B 15/02* (2013.01); *F21Y 2115/10* (2016.08)

(58) Field of Classification Search
CPC ... F21Y 2115/10; A63H 33/009; G03B 15/02; G03B 15/03; G03B 15/05; G03B 15/07; G03B 2215/0567; G03B 2215/0514; G03B 2215/0517; G03B 2215/0557; G03B 2215/056; G03B 2215/0546; G03B 17/561; H04M 1/04; H04M 1/06
See application file for complete search history.

(56) References Cited

U.S. PATENT DOCUMENTS

| | | | |
|---|---|---|---|
| 11,506,367 B1* | 11/2022 | Zhu | F21V 23/023 |
| 2015/0267902 A1* | 9/2015 | Zhang | F21V 21/30 |
| | | | 362/188 |
| 2016/0277660 A1* | 9/2016 | Kaiser | H04N 23/56 |
| 2018/0136544 A1* | 5/2018 | Mink | G03B 15/05 |

FOREIGN PATENT DOCUMENTS

| | | | | |
|---|---|---|---|---|
| CN | 110266863 A | * | 9/2019 | .............. F21V 33/00 |
| CN | 117572708 A | * | 2/2024 | |

* cited by examiner

A-A

B-B

LIGHTING DEVICE

FIELD OF THE INVENTION

The present invention relates to the field of photographic equipment, and in particular to a lighting device.

BACKGROUND OF THE INVENTION

A handheld lighting device, such as a handheld light stick, is a kind of portable lighting equipment that usually consists of a holdable body and a light-emitting member provided on the body, used to provide a light source to illuminate a specific area or for decorative use. Handheld lighting devices are widely used in scenarios, such as outdoor activities, night photography, video production and emergency situations.

In some cases, users need to connect the handheld light stick to other photographic equipment, such as mobile phones, tripod heads, or other auxiliary equipment, to expand its functions or improve the user experience.

Currently available handheld light sticks usually require additional connecting devices to be mounted on the body, and can only be connected to photographic equipment, such as mobile phones and tripod heads by means of additional connecting devices. These additionally included connecting devices increase the complexity and inconvenience of use, and sometimes may require users to purchase additional accessories or perform tedious installation steps. Therefore, there is an urgent need to provide a lighting device to solve the problem of inconvenience of connecting operations between the existing lighting devices and other photographic equipment.

BRIEF SUMMARY OF THE INVENTION

The primary objective of the present invention is to provide a lighting device, aiming to enhance the convenience of connecting the lighting device to external photographic equipment.

To achieve the above objective, the present invention provides a lighting device, which comprises a stick, a light-emitting member arranged on the stick and a panel mechanism. The panel mechanism comprises a panel body and a control unit, the panel body being connected to the stick, the panel body comprising a first connection portion for connecting with external photographic equipment. The control unit is arranged on the panel body and electrically connected with the light-emitting member to control an operation status of the light-emitting member.

In some embodiments, the stick is in a configuration of an elongated bar, and the stick has one end that is connectable with an external object and a middle that is formed with a mounting surface for mounting the panel mechanism.

In some embodiments, the panel body comprises a top surface and a bottom surface that are opposite to each other, and a circumferential wall enclosing circumferences of the top surface and the bottom surface; and the control unit is arranged on the top surface, and the first connection portion protrudes outwards from the circumferential wall.

In some embodiments, the first connection portion is arranged to protrude from the circumferential wall and comprises a first inclined surface extending outwards from the circumferential wall toward the top surface and a second inclined surface extending outwards from the top surface toward the bottom surface, the first inclined surface and the second inclined surface being connected to each other and forming an included angle, the first connection portion being arranged to extend along entirety of the circumferential wall of the panel body.

In some embodiments, the control unit is located at one end of the top surface of the panel body, and the top surface of the panel body is further formed with a second connection portion for slidable connection with the external photographic equipment, the second connection portion and the control unit being arranged to space from each other.

In some embodiments, the second connection portion comprises a plurality of slide grooves arranged to space from each other and a plurality of first holes, the first holes extending from the top surface toward the bottom surface of the panel body, the first holes being used for connection with the external photographic equipment.

In some embodiments, the panel body defines a second hole at the top surface; and the control unit comprises at least one push knob received in the second through hole, and one end of the push knob is exposed on the top surface and an opposite end extends through the second hole into an interior of the stick to electrically connect to the light-emitting member; and the push knob is elastically connected to the stick.

In some embodiments, the control unit comprises a regulation knob, and the top surface of the panel body is recessed to form a receptable portion in which the regulation knob is received, a bottom wall of the receptable portion being formed with a third through hole, the third through hole communicating with the bottom surface; and one end the regulation knob protrudes out of the top surface, and an opposite end extends through the third through hole into the interior of the stick to electrically connect to the light-emitting member; and the regulation knob is rotatably connected to and/or elastically connected to the stick.

In some embodiments, the light-emitting member is mounted on the bottom surface of the stick.

In some embodiments, the lighting device further comprises a display screen arranged on the panel body, the display screen being set adjacent to the control unit and electrically connected to the light-emitting member, the display screen being used for feeding back a status of the light-emitting member.

In some embodiments, one end of one of the stick and the handle is provided with a guide pillar, and an outside wall of the guide pillar is provided with a first electrical conduction member; and one end of another one of the stick and the handle is formed with an insertion aperture, and an inside wall of the insertion aperture is provided with a second electrical conduction member, the first electrical conduction member being used to contact with the second electrical conduction member when the guide pillar is inserted into the insertion aperture in order to form electrical connection between the stick and the handle.

In some embodiments, one end of one of the stick and the handle being provided with an insertion trough, an inside wall of the insertion trough being recessed to form a retention slot and a guide notch, the guide notch extending from a trough opening of the insertion trough in an axial direction of the insertion trough to one end of the retention slot and communicating with the retention notch, the retention slot extending from one end of the guide notch that is away from the trough opening of the insertion trough in a circumferential direction of the insertion trough;

one end of another one of the stick and the handle is provided with an insertion pole, the insertion pole being used for insertion into and mating with the insertion trough, an outside wall of the insertion pole being protruded to form a lug; and the stick and the handle being detachably connected through rotary connection between the lug and the retention notch.

In some embodiments, the insertion trough is further provided, in a protruding form in an interior thereof, with a guide pillar, and the insertion pole is further formed with an insertion aperture, the guide pillar being used to insert into the insertion aperture when the insertion pole is inserted into the insertion trough.

In some embodiments, an outside wall of the guide pillar is provided with a first electrical conduction member, and an inside wall of the insertion aperture is provided with a second electrical conduction member, the first electrical conduction member being used to contact with the second electrical conduction member when the guide pillar is inserted into the insertion aperture in order to form an electrical connection between the stick and the handle. The light-emitting member is arranged on the stick, and an electrical power source is arranged on the handle, the light-emitting member being electrically connected with one of the first electrical conduction member and the second electrical conduction member, the electrical power source being electrically connected with another one of the first electrical conduction member and the second electrical conduction member, electrical connection being formed between the light-emitting member and the electrical power source by means of contact between the first electrical conduction member and the second electrical conduction member.

In some embodiments, one of the first electrical conduction member and the second electrical conduction member is an electrically conductive plate that is arranged in a fixed manner, and another one is an electrically conductive plate that is elastically stretchable; and/or the numbers of the first electrical conduction member and the second electrical conduction member are both plural, the plural first electrical conduction members being arranged at intervals in a circumferential direction of the guide pillar, the plural second electrical conduction members being arranged at intervals in a circumferential direction of the insertion opening, the plural second electrical conduction members and the plural first electrical conduction members being arranged to correspond to each other in a one-to-one manner.

In some embodiments, one of the stick and the handle is further provided with a locking hole, another one is provided with a locking tongue, an unlocking control component, and an elastic returning member; the locking tongue is used to insert into and mate with the locking hole when the lug is set in rotary connection with the retention slot so as to prevent the lug from being rotated out of the retention notch; the unlocking control component is drivingly connected with the locking tongue in order to apply an acting force to the locking tongue to drive the locking tongue to be pulled out of the locking hole in order to allow the lug to rotate out of the retention notch; and the elastic returning member is used to exert an elastic force on the locking tongue for moving and position restoration after the unlocking control component removes the acting force applied to the locking tongue.

In some embodiments, the lighting device further comprises a light barrier board, and a lateral side portion of the stick is provided with a first connection structure, and the light barrier board is provided with a second connection structure, the light barrier board being detachably connected by means of the second connection structure cooperating with the first connection structure.

In some embodiments, one of the first connection structure and the second connection structure comprises a buckling opening, and another one comprises an elastic buckling structure for snap-fitting to the buckling opening; the buckling opening comprises an insertion opening and a positioning hole, and the positioning hole is formed in an inside wall of the insertion opening and in communication with the insertion opening; and the elastic buckling structure comprises an inserting member, a positioning member, and an elastic member, and the inserting member is used for insertion into and mating with the insertion opening, and the positioning member is elastically connected by means of the elastic member to the inserting member, and the positioning member is used to engage with the positioning hole as being acted upon by the elastic force of the elastic member when the inserting member is inserted in the insertion opening.

In some embodiments, the inserting member has a free end, and the inserting member is inserted into the insertion opening in such a manner as to have the free end aligned with the insertion opening; the positioning member is at least partly movably inserted into the inserting member and is connected to the elastic member, and the positioning member comprises a positioning portion and a releasing portion, and the positioning portion and the releasing portion are arranged to space from each other in the direction in which the inserting member is inserted into the insertion opening, and the positioning portion is located between the free end of the inserting member and the releasing portion; the positioning portion is used to extend out of the inserting member under the elastic acting force of the elastic member to get engagement with the positioning hole; and the releasing portion is at least partly exposed outside of the inserting member in order to overcome the elastic acting force of the elastic member as being acted upon by an external force to drive the positioning portion to move and disengage from the positioning hole.

In some embodiments, the elastic buckling structure comprises a connecting plate for connection with the light barrier board and a first axle body for insertion into the locking hole, the connecting plate being positioned on and mounted to one side surface of the light barrier board, the first axle body and the connecting plate defining an included angle that is greater than or equal to 80° and less than or equal to 100°.

In some embodiments, the number of the light barrier board is two, and two opposite lateral side portions of the stick are each provided with at least one first connection structure; and the two light barrier boards are respectively and detachably connected to the two lateral side portions of the stick through cooperation of the second connection structure with the first connection structure.

The solution of the application provides an arrangement of a light-emitting member, a light-emitting member, and a control mechanism, and provides a lighting device that is easy to set up by means of the arrangement, so that while meeting the needs of outdoor/indoor light filling or other photography requirements, the connection between the lighting device of the application and external photographic equipment, such as a tripod head, is more convenient and more efficient.

Figure 1:
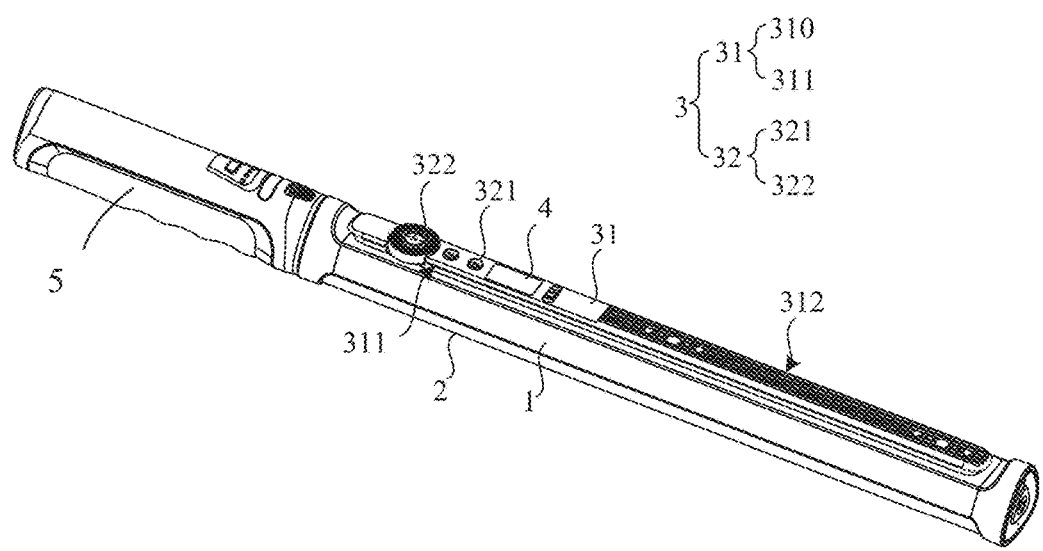
FIG. 1 is a schematic structure diagram of a lighting device according to an embodiment of the present invention.

Further description to the realization of the objective, functional features, and advantages of the present invention will be provided with reference to the drawings.

DETAILED DESCRIPTION OF THE INVENTION

The solutions of the embodiments of the present invention will be clearly and completely described below with reference to the accompanying drawings of the embodiments of the present invention. Obviously, the described embodiments are only some, but not all, of the embodiments of the present invention. Based on the embodiments of the present invention, all other embodiments obtained by those of ordinary skill in the art without making creative efforts fall within the scope of protection of the present invention.

It is noted that all directional indications (such as up, down, left, right, front, back, and the likes) used in the embodiments of the present invention are only used to explain relative position relationship, movement conditions, and so on between components in a specific posture (as shown in the drawings). If the specific posture changes, the directional indication will also change accordingly.

It is also noted that when an element is referred to as being "fixed" or "arranged" on another element, it can be directly on said another element or intervening elements may also be present. When an element is said to be "connected" to another element, it can be directly connected to said another element or there may also be an intervening element present.

In addition, the description of the present invention that involves "first", "second", and the likes are for descriptive purposes only and cannot be construed as indicating or implying their relative importance or implicitly indicating the number of the technical features indicated thereby. Thus, features defined as "first" and "second" may explicitly or implicitly include at least one of these features. Further, the technical solutions of various embodiments can be combined with each other, but it must be carried out based on what are realizable by those of ordinary skill in the art. When the combination of technical solutions is contradictory or is not realizable, it should be considered that such a combination of technical solutions does not exist, nor within the protection scope required by the present invention.

Figure 2:
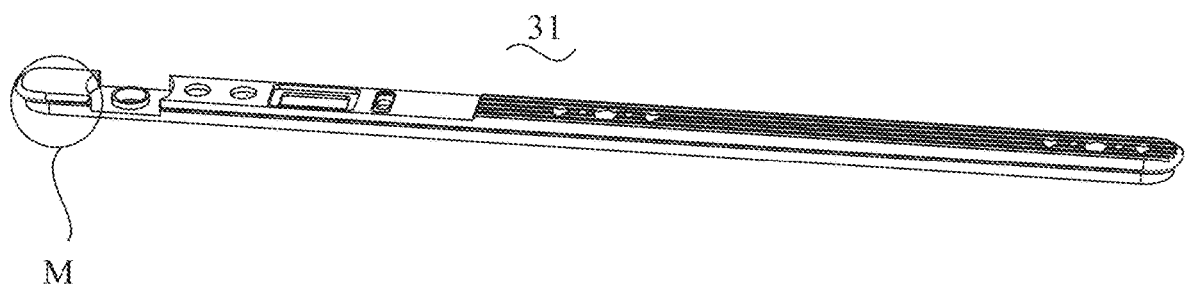
FIG. 2 is a schematic structure diagram of a panel body of the lighting device shown in FIG. 1.
Figure 3:
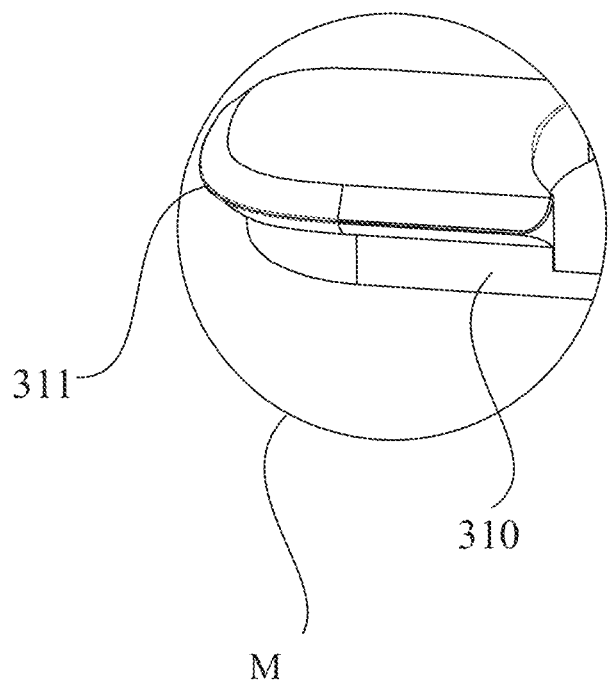
FIG. 3 is a partial enlarged view of portion A of FIG. 2.

Referring to FIGS. 1-3, the present invention provides a lighting device, which comprises a stick 1, a light-emitting member 2, and a panel mechanism 3.

The light-emitting member 2 is arranged on the stick 1.

The panel mechanism 3 comprises a panel body 31 and a control unit 32. The panel body 31 is connected to the stick 1. The panel body 31 comprises a first connection portion 311 for connection with an external photographic equipment 600 (FIG. 7A). The control unit 32 is arranged on the panel body 31. The control unit 32 is electrically connected with the light-emitting member 2 to control an operation state of the light-emitting member 2.

In the present embodiment, the external photographic equipment (such as a tripod head) is connected by means of the first connection portion 311 to the panel body 31. The control unit 32 is capable of supplying electrical power and is electrically connected to the light-emitting member 2. The control unit 32 is configured to control the operation status of the light-emitting member 2, such as power ON/OFF, brightness, and flashing mode. A user, when holding the lighting device with a hand, may direct the light-emitting member 2 toward a photographing subject that needs to be filled with light, and then adjust the lighting status of the light-emitting member 2 through the control unit 32 according to the photographing needs.

The handle 5 is connected to one end of the light stick 1 to provide a hand-holdable support structure. The light-emitting member 2 is a light-emitting source that emits visible light, such as a light-emitting diode (LED) lamp and a fluorescent lamp. The panel body 31 integrates the functions of connecting the external equipment and controlling the light-emitting member 2. The control unit 32 controls the operation voltage/current of the light-emitting member 2 through a circuit, so as to control the intensity and status of light emission thereof. The first connection portion 311 allows external photographic equipment, such as a camera, to quickly connect to the panel body 31, thereby realizing quick connection between the external photographic equipment and the lighting device.

Through the above arrangement, the solution of the application provides a lighting device that is easy to set up. While meeting the needs of outdoor/indoor light filling or other photography requirements, the connection between the lighting device of the present invention and external photographic equipment, such as a tripod head, is convenient and efficient.

Referring to FIGS. 1-3, the light stick 1 provided in an embodiment of the present invention is in the form of an elongated bar. One end of the light stick 1 is used to connect to an external object, and the middle is structured to include a mounting surface for mounting the panel mechanism. In the present embodiment, the stick 1 is in a configuration of an elongated bar, provided as a basic structure for hand-holding and connecting. The configuration of elongated bar facilitates hand-holding operations and mounting with other accessories. One end of the stick 1 away from the handle 5 is provided with a connecting portion, which can not only be connected to an external object, such as a tripod and a handle, to increase functions of supporting and expanding, but is also compatible with an industry standard interface port to achieve multi-functional expansion. The middle of the stick 1 is formed with the mounting surface for mounting the panel mechanism 3, the mounting surface in the middle provides an integrated mounting site for the panel mechanism 3. The overall design of the stick 1 according to the present embodiment makes the handheld light-emitting member easy to hold and operate/control with one hand. One end is structured to include the connecting portion, making it connectable with supporting equipment, such as a tripod, to enhance photographing stability. By connecting an accessory, such as a handle, a variety of ways of holding can be achieved to meet the needs of different photographing scenes. The mounting surface of such an integrated arrangement makes the panel mechanism 3 easy to install and the overall structure compact.

Figure 4:
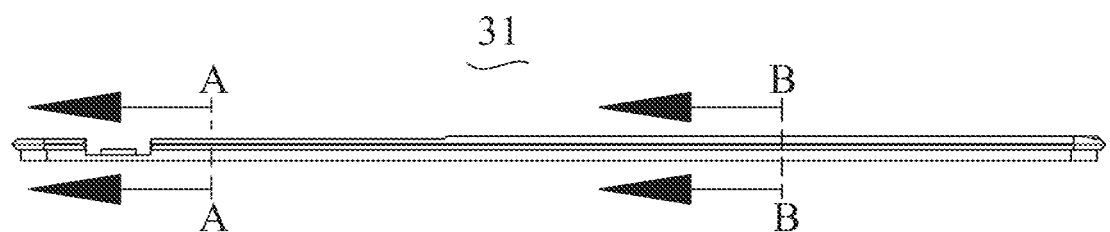
FIG. 4 is a partial schematic structure diagram of a lighting device according to another embodiment of the present invention.
Figure 5:
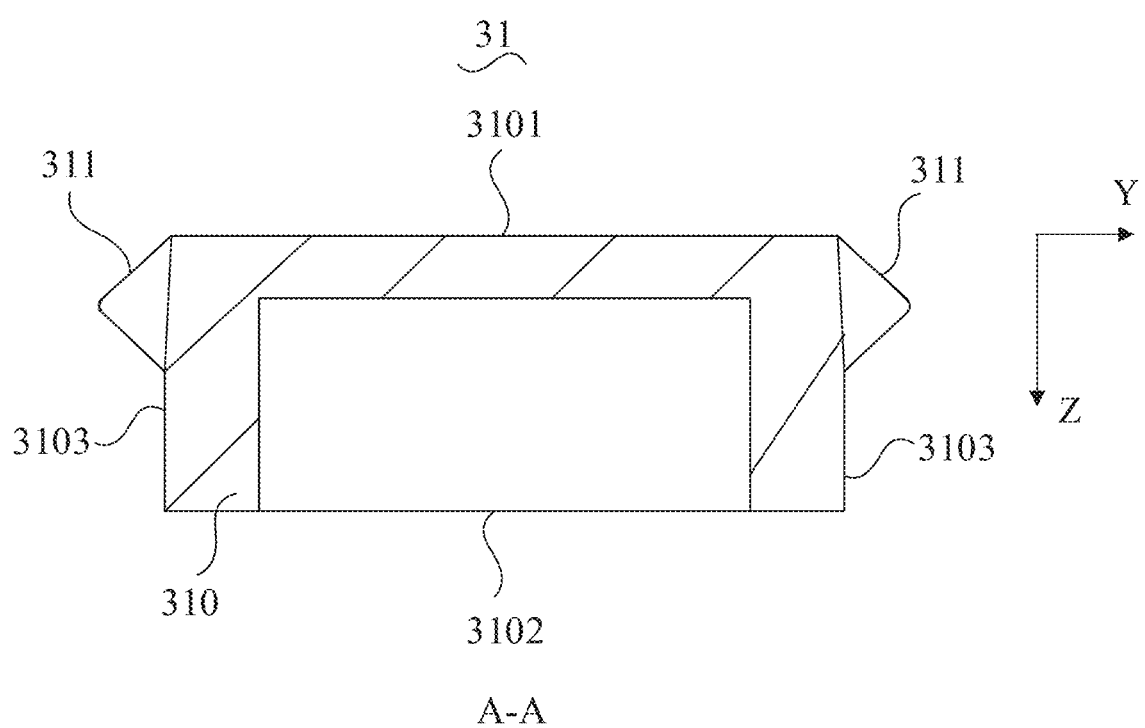
FIG. 5 is a cross-sectional view of a portion of the structure shown in FIG. 4 taken along line A-A.

Further referring to FIGS. 3-5, the panel body 31 provided in an embodiment of the present invention comprises a top surface 3101 and a bottom surface 3102 that are opposite in the thickness direction Z of the panel body 31, and a circumferential wall 3103 surrounding and enclosing circumferences of the top surface 3101 and the bottom surface 3102; the control unit 32 is arranged on the top surface 3101, and the first connection portion 311 protrudes outwards from the circumferential wall 3103. Preferably, the first connection portion 311 surrounds the circumferential wall 3103 in the circumferential direction of the panel body 31.

In the present embodiment, the panel body 31 is arranged in an elongated configuration. The top surface 3101 is used to mount the control unit 32 or other electronic devices. The circumferential wall 3103 surrounds and encloses the top surface 3101 and the bottom surface 3102 to form an integrated configuration. The first connection portion 311 protrudes outwards from the circumferential wall 3103 for easy connection with external equipment. Jointly referring to FIG. 1, in a preferred embodiment, the stick 1 is of a cylindrical configuration in the entirety thereof, and at least one side of the middle is arranged in a thinned manner with respect to two opposite ends to thereby form a mounting plane for mounting the panel mechanism 3 thereon. When the panel mechanism 3 is mounted on the stick 1, the outside surface of the panel mechanism 3 generally flushes with two ends of the stick 1 to form an integrated body. In the present embodiment, the side of the stick 1 opposite to the panel mechanism 3 is mounted with the light-emitting member 2. The light-emitting member 2, when mounted to the stick 1, has an outside surface that is generally flush with two ends of the stick 1. In the present embodiment, the panel mechanism 3 and the light-emitting member 2 are arranged on opposite sides of the stick 1, such as the top surface and the bottom surface of the stick 1 in the thickness direction Z, so as to make the overall appearance of the stick 1 more regular and the visual effect better.

In the present embodiment, the top surface 3101 and the bottom surface 3102 are designed to provide planar surfaces for mounting a circuit board and connecting other components. The circumferential wall 3103 is arranged on a lateral of the top surface 3101 and the bottom surface 3102 to surround the entirety of the top surface 3101 and the bottom surface 3102. Thus, an accommodating space is surrounded by the circumferential wall 3103 for accommodating the circuit board and other components therein. The circumferential wall 3103 is capable of protecting the circuit board and other components from being damaged. The arrangement of the first connection portion 311 protruding outwards from the circumferential wall 3103 is for quick connection with external photographic equipment. The control unit 32 is arranged on the top surface 3101 and integrated with the panel body 31, and is electrically connected with the light-emitting member 2 through internal wiring and controls, according to control logic and external instructions, the operation status of the light-emitting member.

To sum up, the structure provided according to the solution of the present embodiment has a reasonable design and high-degree modularization, wherein the panel body 31 provides an integrated mounting platform for the control unit 32 and connecting components, exhibiting an advantage of expandability.

Referring to FIGS. 3-5, the first connection portion 311 provided in an embodiment of the present invention protrudes outward from the circumferential wall 3103 in an angular configuration and comprises a first inclined surface extending outwards from the circumferential wall 3103 toward the top surface 3101 and a second inclined surface extending outwards from the top surface toward the bottom surface. The first inclined surface and the second inclined surface respectively form two sides of the included angle. The first connection portion 311 is arranged to extend along the entirety of the circumferential wall of the panel body 31.

In the present embodiment, the first inclined surface protrudes obliquely in a direction from an outside of the circumferential wall 3103 toward the top surface 3101. The second inclined surface protrudes obliquely in a direction from the top surface 3101 toward the bottom surface 3102. The first inclined surface and the second inclined surface form an included angle along the circumference of the panel body 31, and the first connection portion 311 is arranged to extend along the entirety of the circumferential wall 3103 of the panel body 31. The first connection portion 311 form a wedge-shaped structure.

Further, in the embodiment of the present invention, the thickness of the first connection portion 311 is set in a gradually varying manner so as to form a wedge-shaped mounting space. When the panel mechanism 3 is mounted to the stick 1, the bottom surface 3102 of the panel body 31 is in contact with the mounting surface of the stick 1, and the first connection portion 311 and the mounting surface of the stick 1 form therebetween the wedge-shaped mounting space. The connector (such as a hot shoe interface) of the external photographic equipment is plugged to the first connection portion to reach a proper mounting site to be locked there by means of the gradually narrowing wedge-shaped space, and no other locking assisting device is needed and the structure is simple. The 360-degree or almost 360-degree surrounding design make it possible for mounting from any position, making the use flexible. Being integrally formed and made of a rigid material, the wedge-shaped structure is robust and durable. The clamping force is reliable to prevent accidental falling and ensure connection quality.

In addition to the aforementioned wedge-shaped structure-based locking, the embodiment of the present invention also makes it feasible for locking of photographing equipment with other auxiliary structures. Referring to FIGS. 1, 4, 6, and 7, the panel body 31 of the embodiment of the present invention further comprises a second connection portion 312, and the second connection portion 312 and the control unit 32 are arranged to space from each other in a length direction X of the stick 1. The second connection portion 312 is used to slidably connect with external photographic equipment.

In the present embodiment, the second connection portion 312 is arranged on a surface of the panel body 31 and is spaced apart from the control unit 32. External photographic equipment (such as a camera) can be slidably connected to the panel body 31 through the second connection portion 312. The external photographic equipment can also be connected to the first connection portion 311 at the same time when connected by the second connection portion 312.

Arrangement of the second connection portion 312 expands the function of connection for the handheld lighting device. The design of sliding connection allows equipment, such as a camera, to flexibly adjust the mounting position. This is a complement to the interface connection function of the first connection portion 311, so as to meet different usage scenarios. The structure is compact in design and does not add additional arrangements and is instead combined with the panel body 31, whereby reducing the overall size and weight and being easy to carry and use.

To sum up, the design of adding the second connection part 312 adds a connection measure other than the first connection part 311 to the handheld lighting device, expands the interoperability with other photographic equipment, improves the flexibility of use, and further enhances the practical value thereof. Reasonable cooperation with other components makes the entire device more versatile and practical.

Figure 6:
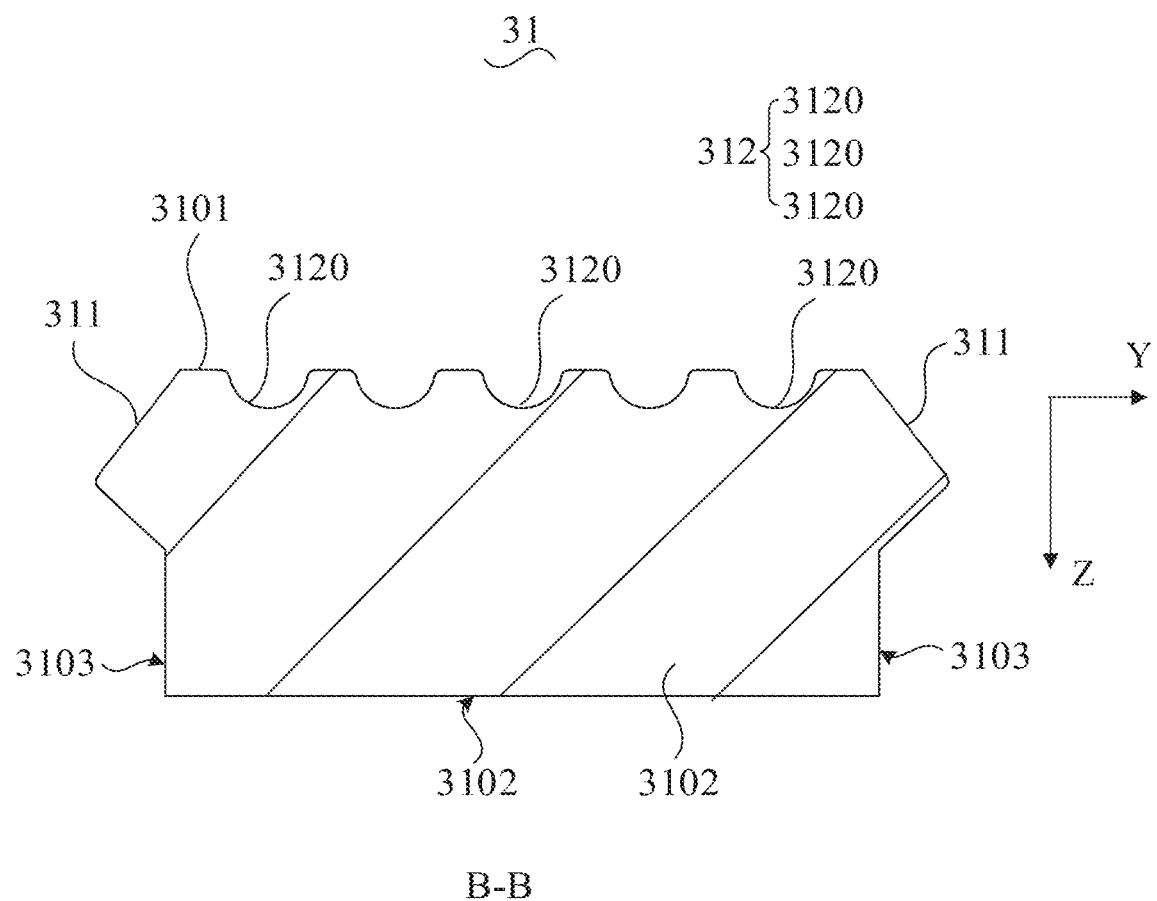
FIG. 6 is a cross-sectional view of a portion of the structure shown in FIG. 4 taken along line B-B.

Referring to FIGS. 4 and 6, the second connection portion 312 provided in an embodiment of the present invention comprises a plurality of slide grooves 3120 arranged to space from each other in a width direction Y of the panel body 31. The slide grooves 3120 are formed in the top surface 3101 of the panel body 31, for example being formed by recessing the top surface 3101 of the panel body 31 in the thickness direction Z of the panel body 3. Each of the slide grooves 3120 extends in the length direction X of the panel body 3.

In the present embodiment, the plurality of slide grooves 3120 are distributed at intervals in the top surface 3101 of the panel body 31. The external photographic equipment is often equipped with slide blocks or lugs that match the shape and size of the slide grooves 3120. Inserting the slide blocks of the external photographic equipment into the slide grooves 3120 fulfills the slidable connection with the panel body 31, and pushing and moving the external photographic equipment in a length direction of the slide grooves 3120 enables adjustment of the mounting position.

The slide grooves 3120 are set up using the mechanical principle of a sliding pair. The components provided on the external photographic equipment and similar to slide blocks are reliably slidable in the slide grooves. The slide groove type connection enables continuous adjustment of the mounting position and has good flexibility. Mounting and removing are simple and efficient and no additional assisting tool is needed.

The solution of the application adds flexibility to the second connection portion 312 by means of the arrangement of the slide grooves 31220. The combination of the second connection portion 312 and the first connection portion 311 provides the entire handheld light-emitting device with connection suitable for various external photographic equipment, improving practicality and adaptability.

Figure 7:
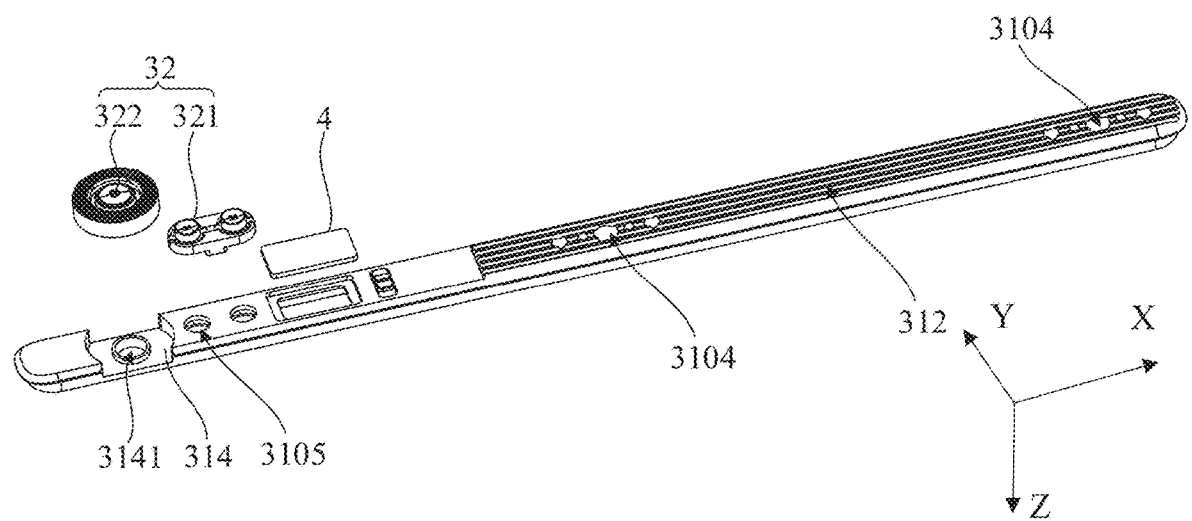
FIG. 7 is an exploded view of a control mechanism according to an embodiment of the present invention.
Figure 7A:
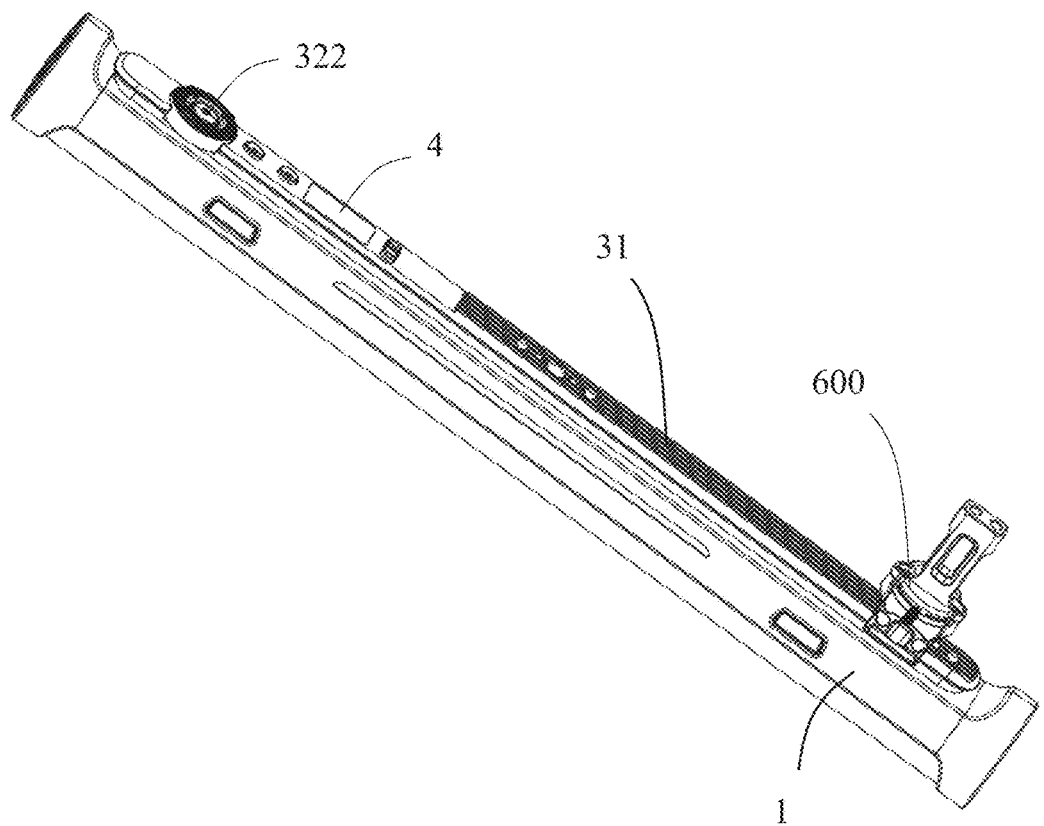
FIG. 7A illustrates an external photographic equipment mounted on a stick of the lighting device according to an embodiment of the present invention.
Figure 8:
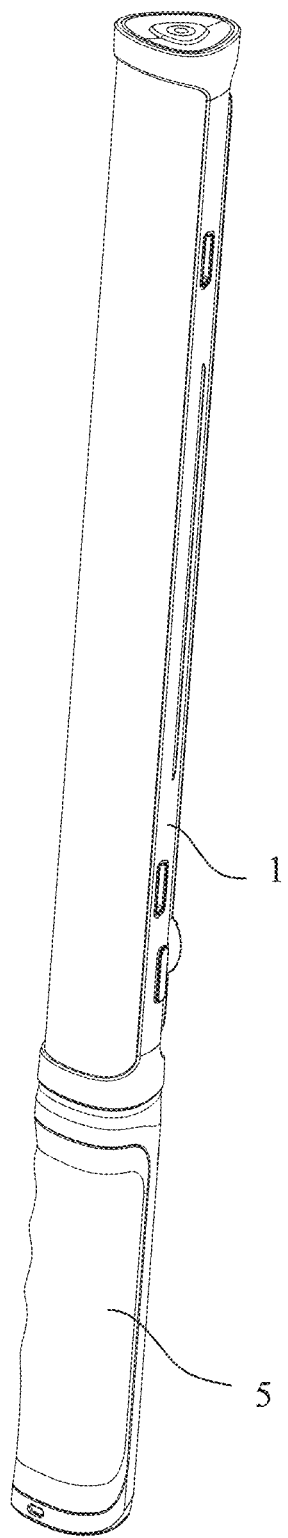
FIG. 8 is a schematic structure diagram of a lighting device according to an embodiment of the present invention.

Referring to FIG. 7, the panel body 31 provided in an embodiment of the present invention is formed with a plurality of first through holes 3104 arranged to space from each other. Each of the first through holes 3104 penetrates through a part of the second connection portion 312. The first through holes 3104 communicate the top surface 3101 and the bottom surface 3102 of the panel body 31. The first through holes 3104 are used for connection with external photographic equipment.

In the present embodiment, the first through holes 3104 penetrate through the top surface 3101 and the bottom surface 3102 of the panel body 31. The plurality of the first through holes 3104 are distributed at intervals in the length direction X of the panel body 31. The first through holes 3104 partly penetrate through the area of the slide grooves 3120 of the second connection portion 312. The external photographic equipment is provided with connection pegs or lugs that match the size of the first through holes 3104. Inserting the connection pegs of the external photographic equipment into the first through holes 3104 fulfills positioning and connecting with respect to the panel body 31, and with the assistance of the first connection portion 311, the feasibility of connecting the lighting device to the external photographic equipment is further increased.

The lug-and-hole coupling means makes mounting and removing easy and efficient, and no assisting tool is needed. The distribution of the first through holes 3104 is flexible such that connectable positions and angles thereof are variable.

To sum up, the design of the first through holes 3104 further expands the connection measure between the external photographic equipment and the panel body 31 and is a supplement to the slide grooves 3120 of the second connection portion 312. The first through holes 3104 and the slide grooves 3120 jointly provide an accurate and reliable multi-point connection interface/sites for the external photographic equipment, greatly improving the flexibility and practicality of the handheld light device.

Referring to FIG. 7, the panel body 31 provided in an embodiment of the present invention is formed with a second through hole 3105, and the second through hole 3105 penetrates, in the panel body thickness direction, through the top surface 3101 and the bottom surface 3102.

The control unit 32 comprises at least one push knob 321 received in the second through hole 3105, and one end of the push knob 321 is exposed outside the top surface 3101, and an opposite end extends through the second through hole 3105 into the interior of the stick 1 to electrically connect to the light-emitting member 2; and the push knob 321 is elastically connected to the stick 1.

In the present embodiment, the second through hole 3105 penetrates the top surface 3101 and the bottom surface 3102 of the panel body 31, providing a channel for mounting and connecting of the push knob 321. The push knob 321 is received in the second through hole 3105, with one end exposed on the top surface 3101 for easy operation by the user. Another end extends through the second through hole 3105 into the interior of the stick 1 to electrically connect with the light-emitting member 2 or a control circuit of the circuit board. Pressing down the push knob 321 controls the lighting status of the light-emitting member. The push knob 321 and the stick 1 adopt an elastic connection design, for example arranging a spring at the connection between the push knob 321 and the stick 1 for position restoration for pressing to increase the service life of the push knob.

The push knob 321 provides a control interface on the stick 1 for the handheld light device. Basic functions, such as power ON/OFF, brightness, and mode, of the light-emitting member 2 can be conveniently controlled. The elastic connection between the push knob 321 and the stick 1 makes the push knob 321 move flexibly and avoids sticking.

To sum up, the design of the second through hole 3105 and the push knob 321 adds a control interface on the stick 1 for the handheld light device, enhancing human-computer interaction and making the functions more comprehensive and complete. The push knob 321 being effectively integrated with modules, such as the control unit 32 and the light-emitting member 2 forms a complete control system, further improving practicality. The number of the second through hole 3105 can be one or multiple and can be determined according to actual needs.

Referring to FIG. 7, the control unit 32 provided in an embodiment of the present invention comprises a regulation knob 322, and the top surface 3101 of the panel body 31 is recessed to form a receptable portion 314 for receiving the regulation knob 322, and the bottom wall of the receptable portion 314 is formed with a third through hole 3141, and the third through hole 3141 communicates the receptable portion 314 with the bottom surface 3102.

One end of the regulation knob 322 protrudes out of the top surface 3101, and an opposite end extends through the third through hole 3141 into the interior of the stick 1 to electrically connect with the light-emitting member 2; and the regulation knob 322 is rotatably connected to and/or elastically connected to the stick 1.

In the present embodiment, the top surface 3101 is formed with the receptable portion 314 for receiving the regulation knob 322 therein, and the bottom wall of the receptable portion 314 is formed with the third through hole 3141 penetrating the bottom surface 3102. The receptable portion 314 and the third through hole 3141 provide a space and a channel for mounting and connecting of the regulation knob 322. One end of the regulation knob 322 protrudes out of the receptable portion 314 of the top surface 3101 for easy operation by the user, and an opposite end extends through the third through hole 3141 into the interior of the stick I to electrically connect with the light-emitting member 2 or the control circuit.

By rotating and/or pressing the regulation knob 322, the parameters of the lighting status (such as brightness and color temperature) can be controlled and adjusted. The regulation knob 322 and the stick 1 adopt a rotational connection and/or elastic connection design. In some embodiments, the regulation knob 322 may adopt a dial design. Adding the regulation knob 322 expands the operation mode of controlling the handheld light-emitting device. Various parameters of the light-emitting member 2 can be finely adjusted, such as brightness, color temperature, and mode to be complementary to the push knob 321.

To sum up, in the present embodiment, the regulation knob 322, the receptable portion 314 and the third through hole 3141 cooperatively provide a fine parameter adjustment function for the lighting device, bettering the operation experience and further improving the control system of the lighting device.

Referring to FIG. 7, the lighting device provided in an embodiment of the present invention provides further comprises a display screen 4 arranged on the panel body 31, and the display screen 4 is arranged closely adjacent to the control unit 32 and is electrically connected to the light-emitting member 2 (see FIG. 13A), and the display screen 4 is used for feedback of the status of the light-emitting member 2.

In the present embodiment, the display screen 4 is arranged on the surface of the panel body 31 and is set at a location closely adjacent to the control unit 32. The display screen 4 is electrically connected to the light-emitting member 2 and the control circuit. The display screen 4 may monitor an operation status parameter of the light-emitting member 2 in real time. By setting up a single-chip microcomputer electrically connected with the display screen 4 and the light-emitting member 2, the single-chip microcomputer transmits data of the status parameter of the light-emitting member 2 to the display screen 4, and the display screen 4 reads and analyzes the data to display the corresponding status in a visualizable form, so that the user may directly observe the current operation status of the light-emitting member 2. Other operation status, such as that of the electrical power source, of the lighting device can also be monitorable.

To sum up, the addition of the display screen 4 allows the user to handle the operation status of the lighting device through intuitive interface feedback, realizing visualization of the operation status of the lighting device.

Referring to FIGS. 8-13A, in some embodiments, the handle 5 and the stick 1 are connected in a detachable manner.

Specifically, an end of one of the stick 1 and the handle 5 is provided with an insertion trough 10, and the inside wall of the insertion trough 10 is recessed to form a retention slot 11 and a guide notch 12. The insertion thought 10 comprises an opening formed at the end of one of the stick 1 and the handle 5. The guide notch 12 is extended from the opening of the insertion trough 10 in an axial direction of the insertion trough 10 (i.e., the length direction of the stick 1) to one end of the retention slot 11 to communicate with the retention slot 11. The retention slot 11 is extended from one end of the guide notch 12 that is away from the opening of the insertion trough 10 in a circumferential direction of the insertion trough 10.

One end of the other one of the stick 1 and the handle S is provided with an insertion pole 52, and the insertion pole 52 is used for insertion into and mating with the insertion trough 10. A plurality of lugs 54 protrudes outward from the outside wall of the insertion pole 52. The lugs 54 can be inserted into the guide notch 12 and then be rotated to be locked in the retention slot 11. Rotary connection between the lugs 54 and the retention slot 11 fulfills detachable connection between the stick 1 and the handle 5.

In the above, the stick 1 and the handle 5 are respectively provided with the insertion trough 10 and the insertion pole 52. For example, it is feasible to provide the insertion trough 10 in the stick 1 and to provide the insertion pole 52 on the handle 5; and it is alternatively feasible to provide the insertion trough 10 in the handle 5 and to provide the insertion pole 52 on the stick 1, the arrangement can be made according to actual needs. Further, one end of the stick 1 connected to the handle S is referred to as a first connection end, the end surface of the first connection end being provided with the insertion trough 10 or the insertion pole 52; one end of the handle 5 connected to the stick 1 is referred to as a second connection end, the end surface of the second connection end being provided with the insertion pole 52 or the insertion trough 10. When the first connection end of the stick 1 and the second connection end of the handle 5 are connected face-to-face, the insertion pole 52 is inserted into and retained in the insertion trough 10 correspondingly.

Further, the inside wall of the insertion trough 10 is formed with the retention slot 11 and the guide notch 12, and the guide notch 12 extends from the opening of the insertion trough 10 in the axial direction of the insertion trough 10 to one end of the retention slot 11 and communicate with the retention slot 11, and the retention slot 11 extends from one end of the guide notch 12 that is away from the trough opening of the insertion trough 10 in the circumferential direction of the insertion trough 10, and further, the guide notch 12 and the retention slot 11 are in communication with each other so as to define an L-shaped combined channel in the inside wall of the insertion trough 10. The outside wall of the insertion pole 52 is formed with the lugs 54. When the insertion pole 52 is inserted into the insertion trough 10, the lugs 54 are inserted into the corresponding guide notches 12. The insertion pole 52 can then be rotated about its axis in the insertion through 10 to cause the lugs 54 to be engaged in the corresponding retention slots 11 so as to fulfill positioning and fixing of the insertion pole 52 in the insertion trough 10, thereby achieving tight fitting between the insertion pole 52 and the insertion trough 10. The guide notches 12 are configured to guide the lugs 54 into the retention slots 11 or to guide the lugs 54 out of the retention slots 11, wherein the length of the guide notch 12 can be set according to an actual situation, and no limitation is imposed herein.

Figure 9:
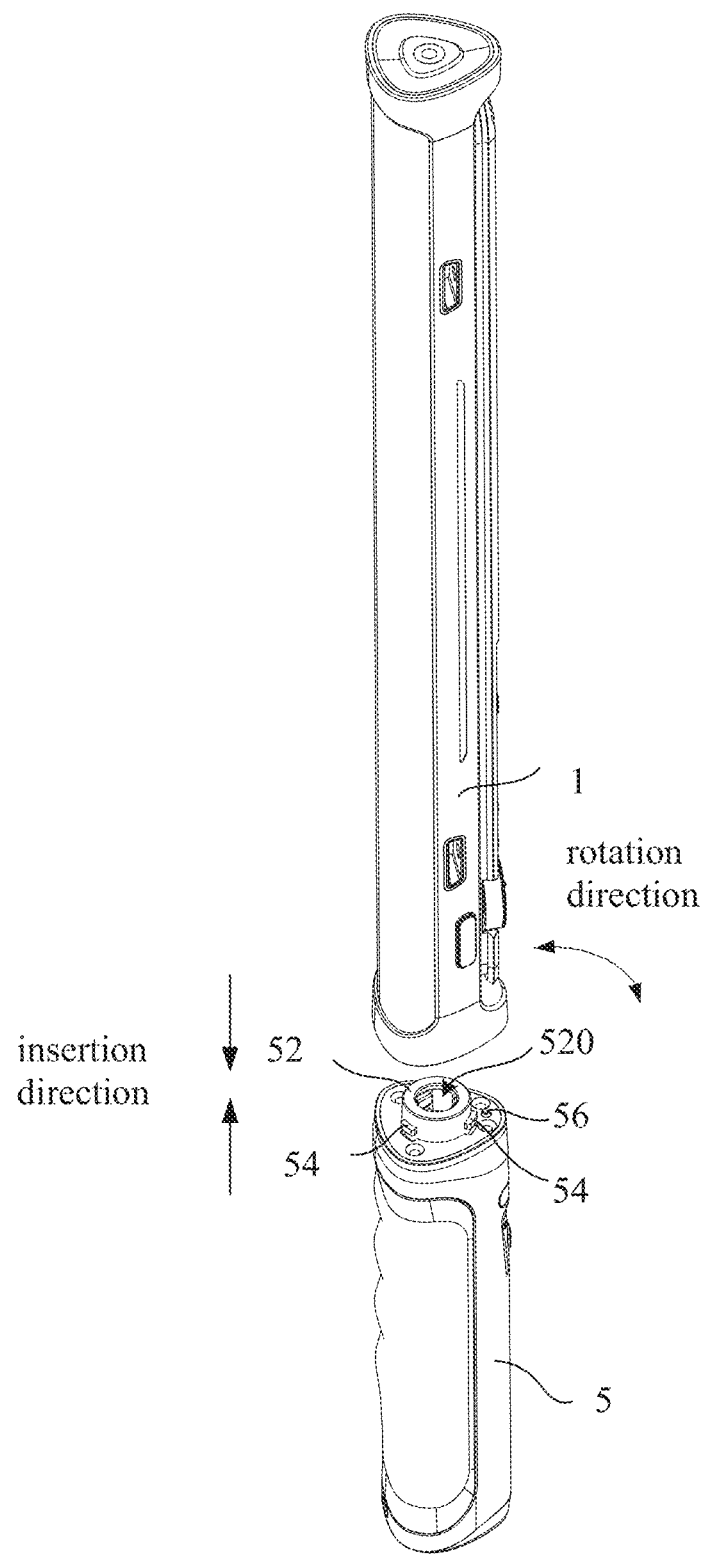
FIG. 9 is an exploded view of the lighting device shown in FIG. 8.
Figure 10:
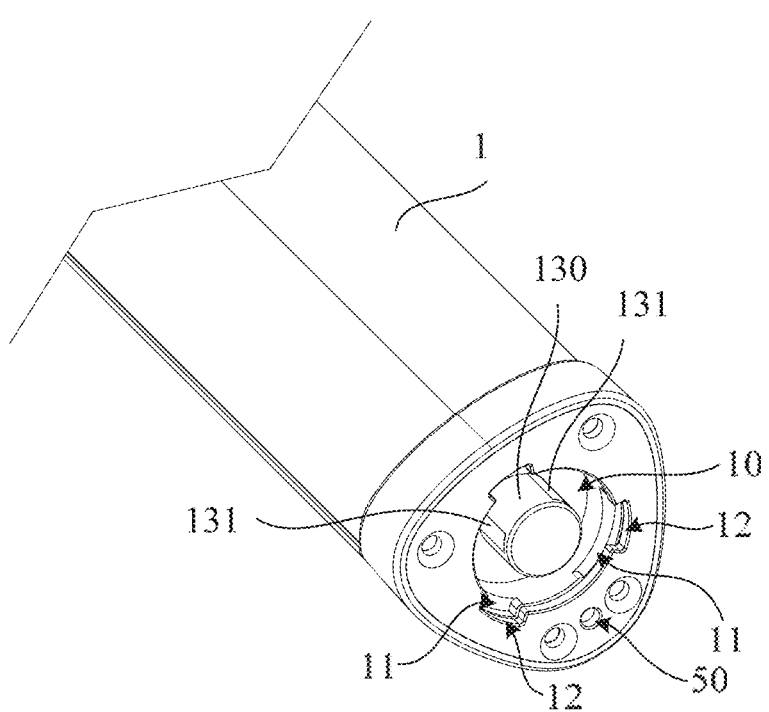
FIG. 10 is a schematic structure diagram of a portion of a stick of the embodiment shown in FIG. 8.
Figure 11:
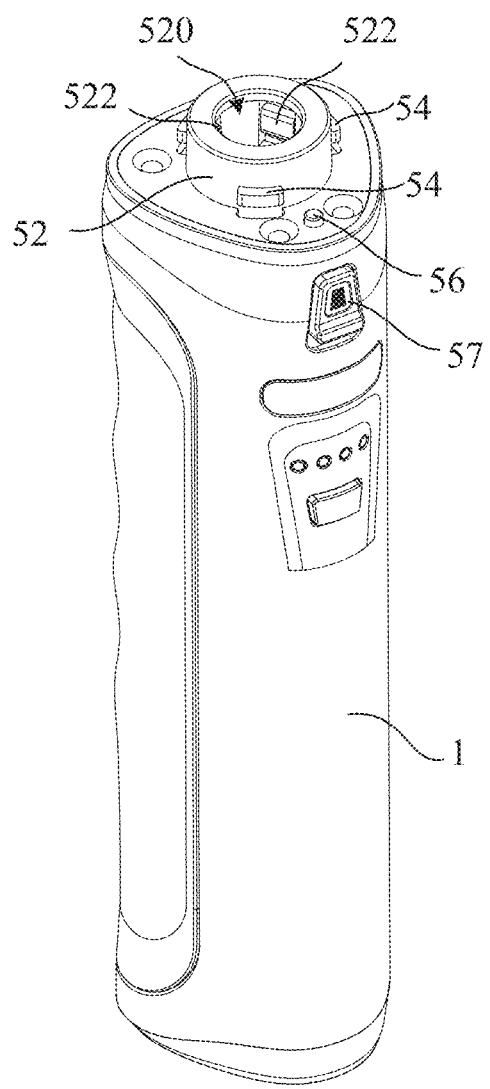
FIG. 11 is a schematic structure diagram of a handle of the embodiment shown in FIG. 8.

As shown in FIG. 9-11, assembling and disassembling principle of the lighting device is as follows:

To assemble the stick 1 and the handle 5, the stick 1 and the handle 5 are connected face to face so that the insertion pole 52 is inserted into the insertion trough 10. During the course of insertion, the lugs 54 on the outside wall of the insertion pole 52 correspondingly moves along the corresponding guide notches 12 in the inside wall of the insertion trough 10 to get into the corresponding retention slots 11, and after being inserted into place, the stick 1 or the handle 5 is rotated (namely relative rotation performed between the two) to have the lugs 54 moved in the retention slots 11 to get away from the guide notch 12, thereby fulfilling rotary connection with the retention slot 11, and at this moment, the lugs 54 are moved away from the guide notches 12, and the insertion pole 52 is firmly maintained in the insertion trough 10 and cannot be detached therefrom, thereby making the stick 1 and the handle S tightly connected and not easy to loosen.

To disassemble the stick 1 and the handle 5, the stick 1 or the handle 5 is rotated (namely relative rotation performed between the two) to have the lugs 54 on the outside wall of the insertion pole 52 moved in the retention slots 11 toward the corresponding guide notches 12, and when the lugs 54 are rotated to reach connection sites between the retention slots 11 and the guide notches 12, the lugs 54 are allowed to slide out along the corresponding guide notches 12, so that the insertion pole 52 can be pulled out of the insertion trough 10 to realize separation of the stick 1 and the handle 5.

In the above, the direction of rotation of the stick 1 during the course of assembling is opposite to the direction of rotation of the stick 1 during the course of disassembling, and/or the direction of rotation of the handle 5 during the course of assembling is opposite to the direction of rotation of the handle 5 during the course of disassembling.

In other words, the stick 1 and the handle S of the lighting device are connected through inserting mating between the insertion trough 10 and the insertion pole 52 in combination with rotary connection between the lugs 54 of the insertion pole 52 and the retention slots 11 of the insertion trough 10. The connection structure between the stick 1 and the handle 5 of the lighting device according to the present invention is simple, and the connection is tight and not easy to loosen, any may ensure the normal use of the lighting device.

In some embodiments, referring to FIGS. 10 and 11, the insertion trough 10 is further provided, in a protruding form in the interior thereof, with a guide pillar 130, and the insertion pole 52 is further formed with an insertion aperture 520. The guide pillar 130 is configured to insert into the insertion aperture 520 for mating with the insertion aperture 520 when the insertion pole 52 is inserted into the insertion trough 10. The insertion aperture 520 is formed by recessing an end face of the free end of the insertion pole 52, and the guide pillar 130 is formed by protruding from a bottom wall of the insertion trough 10 and extending toward the opening of the insertion trough 10. When the insertion pole 52 is inserted into and mounted to the insertion trough 10, the guide pillar 130 correspondingly reaches into the insertion aperture 520 and moves along the insertion aperture 520 to fulfill insertion fitting with the insertion aperture 520. By means of insertion fitting between the guide pillar 130 and the insertion aperture 520, the insertion of the insertion pole 52 into the insertion trough 10 can be guided and positioned, thereby improving the accuracy and stability of insertion of the insertion pole 52 into the insertion trough 10.

Figure 12:
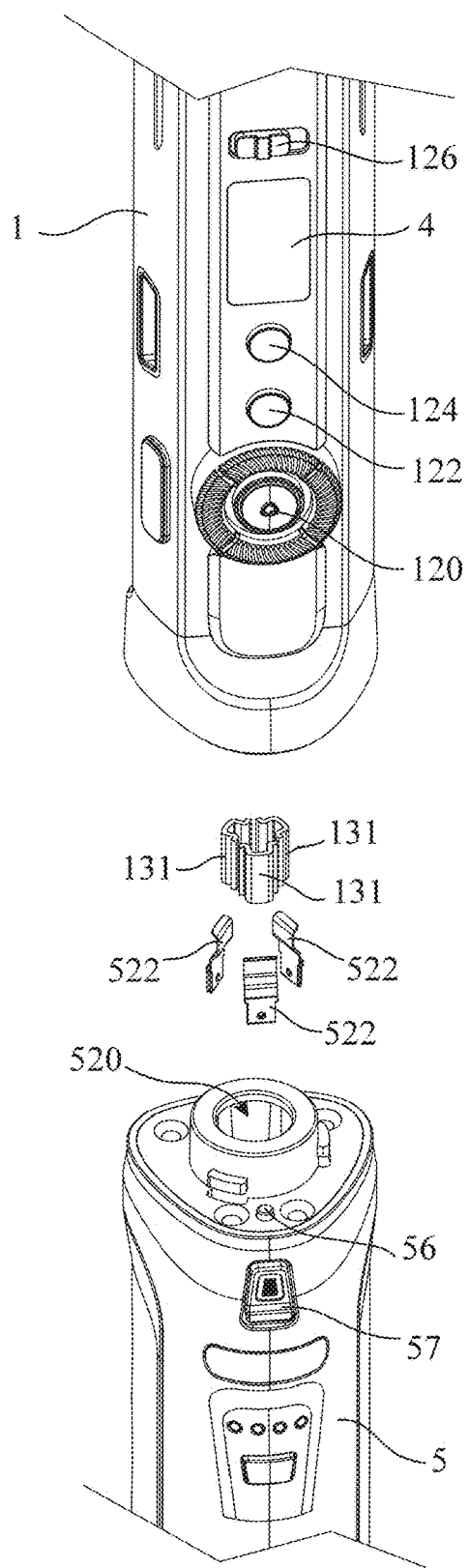
FIG. 12 is a schematic structure diagram, in an exploded form, showing a portion of a lighting device according to an embodiment of the present invention.

In some embodiments, referring to FIGS. 10-12, the outside wall of the guide pillar 130 is provided with a first electrical conduction member 131, and the inside wall of the insertion aperture 520 is provided with a second electrical conduction member 522. The first electrical conduction member 131 is configured to contact with the second electrical conduction member 522 when the guide pillar 130 is inserted into the insertion aperture 520, in order to fulfill electrical connection between the stick 1 and the handle 5.

After the stick 1 and the handle 5 are assembled together, the guide pillar 130 is correspondingly inserted into the insertion aperture 520, and the second electrical conduction member 522 on the inside wall of the insertion aperture 520 is set in alignment with and thus in contact engagement with the first electrical conduction member 131 on the outside wall of the guide pillar 130. Through the contact engagement between the first electrical conduction member 131 and the second electrical conduction member 522, electrical connection is fulfilled between the handle 5 and the stick 1, and conduction of electricity and transmission of signal between the two are achieved. The first electrical conduction member 131 and the second electrical conduction member 522 may have various structural forms, such as contact type, needle type, and sheet type.

In some embodiments, referring to FIG. 12, one of the first electrical conduction member 131 and the second electrical conduction member 522 is a conductive plate that is arranged in a fixed manner, while the other one is an elastic electrically conductive plate that is elastically stretchable. In this embodiment, the second electrical conduction member 522 is an elastic electrically conductive plate a first end of which is fixed to the inside wall of the insertion aperture 520 and a second end of which is a free end bent inwardly relative to the first end. The free end of the second electrical conduction member 522 is configured for elastically abutting against the first electrical conduction member 131 to thereby achieve an electrical connection therebetween.

The numbers of the first electrical conduction member 131 and the second electrical conduction member 522 may both be multiple. The multiple first electrical conduction members 131 are arranged at intervals in a circumferential direction of the guide pillar 130, and the multiple second electrical conduction members 522 are arranged at intervals in a circumferential direction of the insertion aperture 520, and the multiple second electrical conduction members 522 and the multiple first electrical conduction member 131 are arranged to correspond to each other in a one-to-one manner.

In the present embodiment, optionally, the first electrical conduction member 131 and the second electrical conduction member 522 are both electrically conductive plates, and one of them is arranged as an elastic electrically conductive plate that is elastically stretchable so that elastic contact engagement is formed therebetween when the two come into contact with each other to thereby fulfill stable connection and avoid poor contacting and abnormality of electrical conduction. Specifically, each of the first electrical conduction member 131 comprises a convex middle portion and a pair of wings extending inwardly from opposite sides of the middle portion to thereby clasp the outside wall of the guide pillar 130. One axial end of the second electrical conduction member 522 is fixed to the inside wall of the insertion aperture 520 and the other axial end of the second electrical conduction member 522 is a free end which is elastically swingable relative to the fixed end.

In some embodiments, the stick 1 is provided with the light-emitting member 2 arranged thereon, and the handle S is provided with the electrical power source. The light-emitting member 2 is electrically connected with one of the first electrical conduction member 131 and the second electrical conduction member 522, and the electrical power source is electrically connected with the other one of the first electrical conduction member 131 and the second electrical conduction member 522. The light-emitting member 2 and the electrical power source are electrically connected through the contact engagement between the first electrical conduction member 131 and the second electrical conduction member 522.

When the first electrical conduction member 131 is arranged on the stick 1 and the second electrical conduction member 522 is arranged on the handle 5, the light-emitting member 2 is correspondingly and electrically connected with the first electrical conduction member 131 while the handle 5 is correspondingly and electrically connected with the second electrical conduction member 522. When the second electrical conduction member 522 is arranged on the stick 1 and the first electrical conduction member 131 is arranged on the handle 5, the light-emitting member 2 is correspondingly and electrically connected with the second electrical conduction member 522 while the handle 5 is correspondingly and electrically connected with the first electrical conduction member 131. With the first electrical conduction member 131 and the second electrical conduction member 522 being set in contact with each other, a circuit is formed between the electrical power source and the light-emitting member for conducting, and the electrical power source is allowed to supply electrical power to the light-emitting member.

In some embodiments, referring to FIGS. 10 and 11, the numbers of the retention slots 11 and the lugs 54 may both be multiple. The multiple retention notches 11 are arranged at intervals in a circumferential direction of the insertion trough 10, and the multiple lugs 54 are arranged at intervals in a circumferential direction of the insertion pole 52, and the plural retention notches 11 and the plural lugs 54 are arranged to correspond to each other in a one-to-one manner. Specifically, the numbers of the retention slot 11 and the lug 54 are both multiple, and the multiple retention notches 11 and the plural lugs 54 correspond to each other in a one-to-one manner. For example, there are three retention notches 11 and three lugs 54, and the three retention notches 11 and the three lugs 54 correspond to each other in a one-to-one manner. When the stick 1 and the handle 5 are assembled together, during the insertion of the insertion pole 52 into the insertion trough 10, the lugs 54 on the outside wall of the insertion pole 52 correspondingly move through the guide notches 12 in the inside wall of the insertion trough 10 to get into the retention notches 11 corresponding thereto and form rotary connection therewith. By arranging the retention notches 11 and the lugs 54 in multiple ones, multi-point connection can be achieved, which facilitates to improve stability and reliability of connection between the stick 1 and the handle 5.

In some embodiments, referring to FIGS. 9-11, one of the stick 1 and the handle 5 is further provided with a locking hole 50, while the other one is provided with a locking tongue 56, an unlocking control component 57, and an elastic returning member 58.

The locking tongue 56 is configured to insert into and mate with the locking hole 50 when the lugs 54 are engaged in the retention slots 11 so as to prevent the lugs 54 from being rotated out of the retention slots 11.

The unlocking control component 57 is drivingly connected with the locking tongue 56 in order to apply an acting force to the locking tongue 56 to drive the locking tongue 56 to be pulled out of the locking hole 50, thereby allowing the stick 1 and the handle S to rotate relative to each other to have the lugs 54 rotated out of the retention slots 11.

The elastic returning member 58 is configured to exert an elastic restoring force on the locking tongue 56 to cause the locking tongue 56 to return to its original position after the acting force applied to the locking tongue 56 by the unlocking control component 57 is removed.

In the above, the locking tongue 56, the unlocking control component 57, and the elastic returning member 58 collaborate with the locking hole 50 to fulfill locking and unlocking of the rotary connection between the lug 54 and the retention slot 11. In the locked condition, the lugs 54 cannot be rotated to get out of the retention slots 11; and in the unlocked condition, the lug 54 can be rotated to get out of the retention slots 11.

Specifically, during the course of assembling, when the stick 1 or the handle 5 is rotated so that the lugs 54 rotate in the retention slot 11 away from the guide notches 12 to thereby achieve rotary connection to the retention slot 11, the locking tongue 56 and the locking hole 50 are aligned with each other and under the action of the elastic force of the elastic returning member 58, the locking tongue 56 restores to its original position where the free end of the locking tongue 56 extends out of the connecting end of the handle 5 and inserts into the locking hole 50 for locking, and the elastic force that the elastic returning member 58 applies to the locking tongue 56 makes the locking tongue 56 stably be inserted in the locking hole 50, so as to prevent the lugs 54 from rotating out of the retention slots 11 and ensure stability of connection between the stick 1 and the handle 5. Further, during the course of disassembling, an acting force may be applied through the unlocking control component 57 to the locking tongue 56 to drive the locking tongue 56 to retract back and move out of the locking hole 50 for unlocking, thereby allowing the lugs 54 to rotate out of the retention slots 11, and then, a next step of the disassembling operation can be carried out, namely rotating of the stick 1 or the handle 5.

Figure 13:
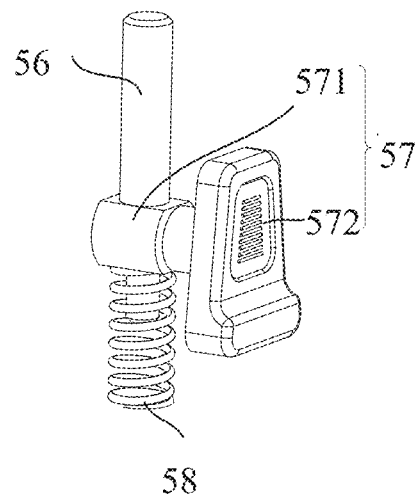
FIG. 13 is a schematic structure diagram showing a locking tongue, an unlocking control component, and an elastic returning member according to an embodiment of the present invention in an assembled condition.
Figure 13A:
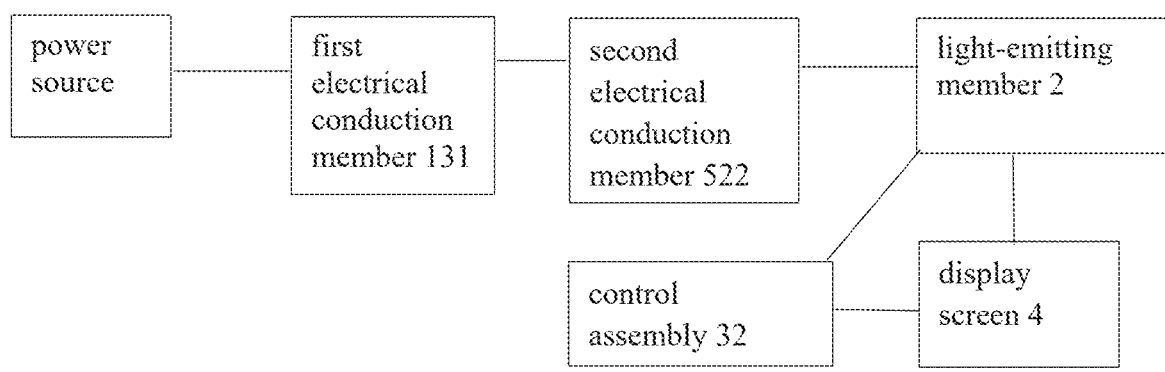
FIG. 13A is a schematic electrical connection diagram of an electrical power source, a first electrical conduction member, a second electrical conduction member, and a light-emitting member according to an embodiment of the present invention.

In some embodiments, the elastic returning member 58 may be a helical spring. One end of the spring acts on the locking tongue 56, and the other end of the spring is set in contact engagement with a mounting object (the handle 5 or the stick 1) to which the locking tongue 56 is mounted, so that the compressed spring can apply an elastic force to the locking tongue 56. The unlocking control component 57 can be a manually driven component, and for example, as shown in FIG. 13, the unlocking control component 57 may comprise a movable seat 571 and a slide knob 572. The movable seat 571 is arranged inside of the mounting object (such as the handle 5) to which the locking tongue 56 is mounted, and the slide knob 572 is arranged, in a slidable manner, on an outside surface of the mounting object and extends through the mounting object to connect to the movable seat 571. The movable seat 571 is hidden within the handle 5. The locking tongue 56 is fixedly mounted on the movable seat 571. The user may drive the slide knob 572 to slide relative to the handle 5 so as to make the movable seat 571 together with the locking tongue 56 to move. The operation is simple and easy. In addition, the unlocking control component 57 may alternatively be an electrically driving component, such as an electric motor and a rack and pinion assembly.

In some embodiments, referring to FIG. 12, the stick 1 is provided with a display screen 4 and a control unit. The control unit may comprise, for example, at least one of a mode memorization button 120, a mode type switching button 122, a mode switching button 124, and an ON/OFF switch button 126. The front surface of the stick 1 is used as a light-emitting surface, meaning the light-emitting member 2 is arranged on the front surface (which corresponds to the top surface shown in FIGS. 1-7). The display screen 4 and the buttons are arranged on a back surface of the stick 1 (which corresponds to the bottom surface shown in FIGS. 1-7). In a practical application, the display screen 4 may be used to display status information of the stick 1, such as parameters including but not limited to brightness and color temperature. The mode memorization button 120, the mode type switching button 130, the mode switching button 140, and the ON/OFF switch button 150 are respectively configured for different function controls. For example, the mode memorization button 120 is configured for mode memorization; the mode type switching button 130 is configured for switching of mode type; the mode switching button 140 is configured to switch modes; and the ON/OFF switch button 150 is configured to power on and off the stick 1.

In the present embodiment, optionally, the first electrical conduction member 131 and the second electrical conduction member 522 are both electrically conductive plates, and one of them is arranged as an elastic electrically conductive plate that is elastically stretchable so that elastic contact engagement can be formed between the first electrical conduction member 131 and the second electrical conduction member 522 to thereby fulfill stable connection and avoid poor contacting and abnormality of electrical conduction.

Optionally, in some embodiments, the insertion pole 52 and the insertion trough 11 can be omitted, and one of the stick 1 and the handle 5 is alternatively provided with the guide pillar 130, while the other one is provided with the insertion aperture 520. After the stick 1 and the handle 5 are assembled together, the guide pillar 130 is correspondingly inserted into the insertion aperture 520, and the second electrical conduction member 522 arranged on the inside wall of the insertion aperture 520 and the first electrical conduction member 131 arranged on the outside wall of the guide pillar 130 are set in alignment, and thus in contact engagement, with each other. Through the contact engagement between the first electrical conduction member 131 and the second electrical conduction member 522, electrical connection is fulfilled between the handle 5 and the stick 1, and conduction of electricity and transmission of signal between the two are achieved. The stick 1 may use the first mechanical connection structure thereof to connect with the second mechanical connection structure of the handle 5, and threading engagement between the external thread and the internal thread may be used to fulfill detachable connection, and the connection is stable and disassembling is easy. In this, it is feasible that the internal thread is formed on the first mechanical connection structure of the stick 1 and the external thread is formed on the second mechanical connection structure of the handle 5; or it is alternatively feasible that the internal thread is formed on the second mechanical connection structure of the handle 5, and the external thread is formed on the first mechanical connection structure of the stick 1. The arrangement is made according to actual situations, and there is no limitation to this.

Figure 14:
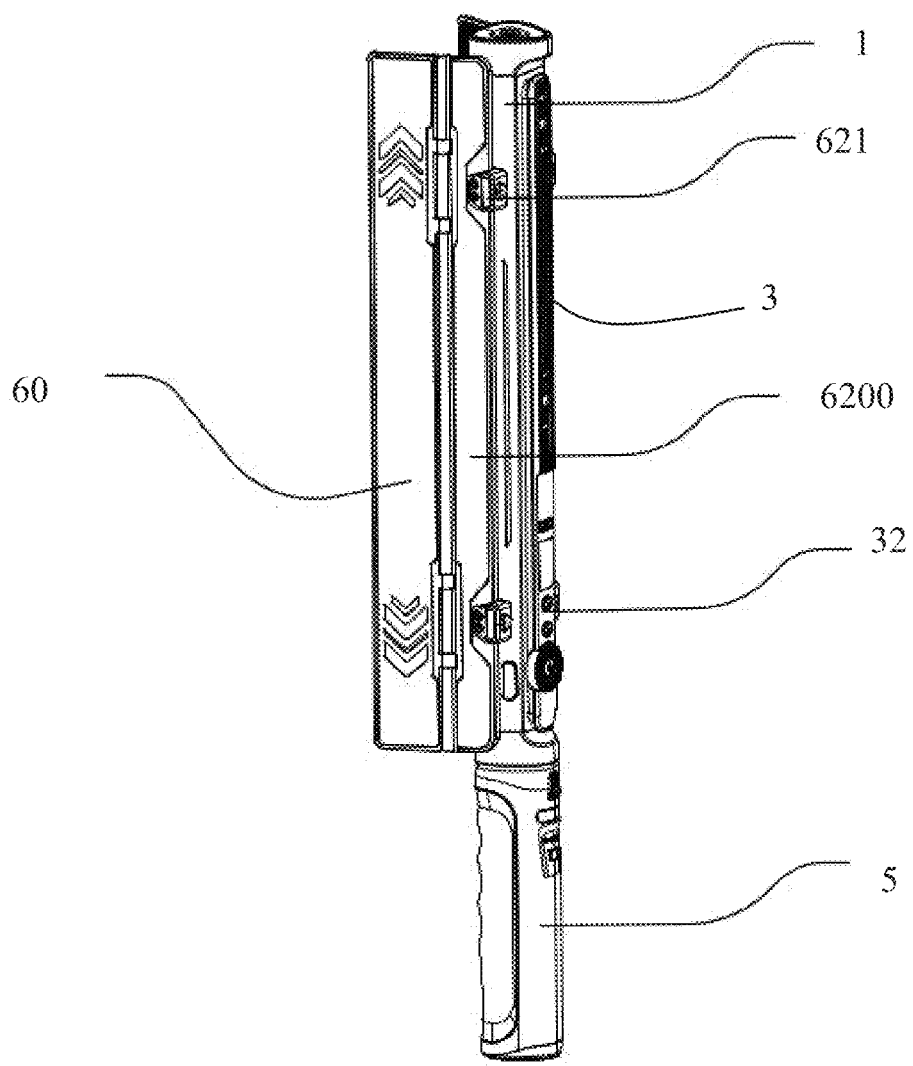
FIG. 14 is a schematic structure diagram showing an embodiment of a lighting device according to the present invention.
Figure 15:
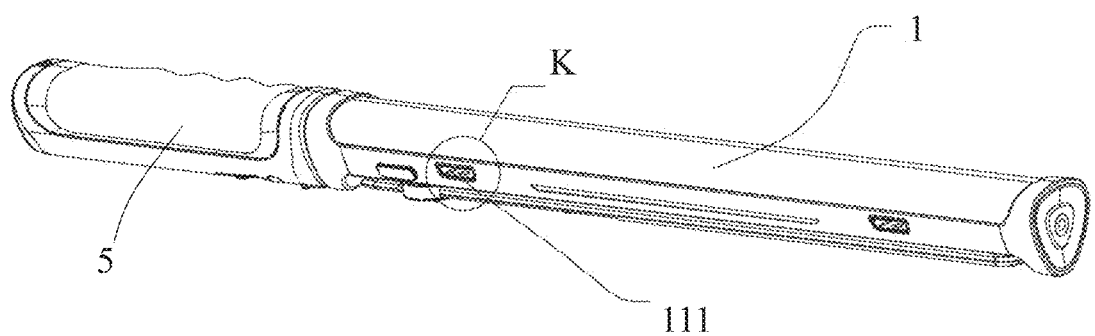
FIG. 15 is a schematic structure diagram showing a stick of an embodiment of the present invention.

Referring to FIGS. 14 to 15, in some embodiments, the lighting device further comprises a light barrier board 60.

A lateral side portion of the stick 1 is provided with a first connection structure 111, and the light barrier board 60 is provided with a second connection structure 621. The second connection structure 621 cooperates with the first connection structure 111 so as to fulfill detachable connection of the light barrier board 60 to the stick 1.

Specifically, the stick 1 provided in an embodiment of the present invention is in the form of an elongated bar. One end of the stick 1 away from the handle 5 is used to connect to an external object, and the middle between opposite two axial ends comprise a top surface acting as a mounting surface for mounting the panel mechanism and a bottom surface on which the light-emitting member 2 is mounted. The first connection structure 111 is arranged at a side wall between the top surface and the bottom surface of the stick 1, as shown in FIG. 15.

Figure 16:
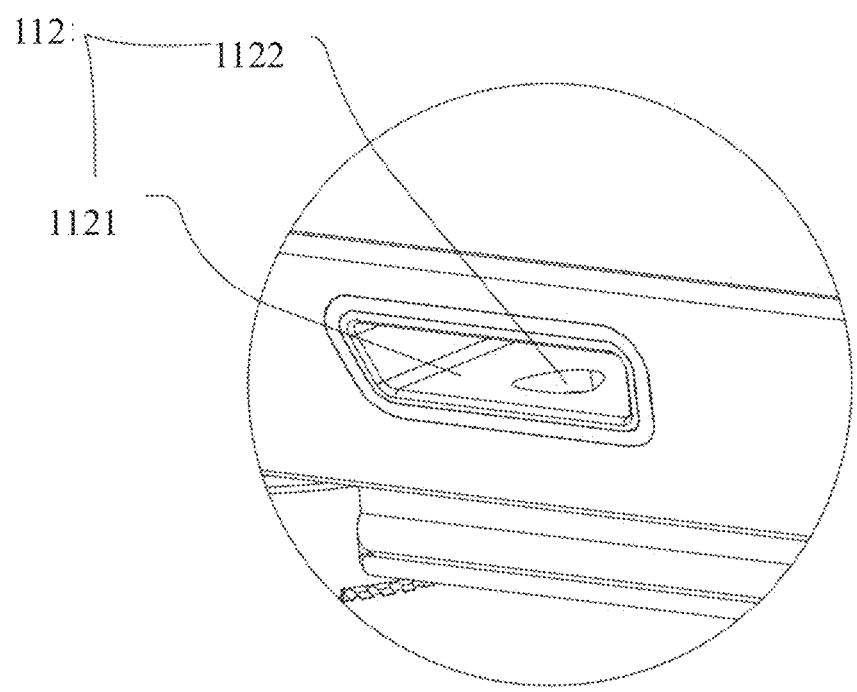
FIG. 16 is a partial enlarged view of portion F of FIG. 15.
Figure 17:
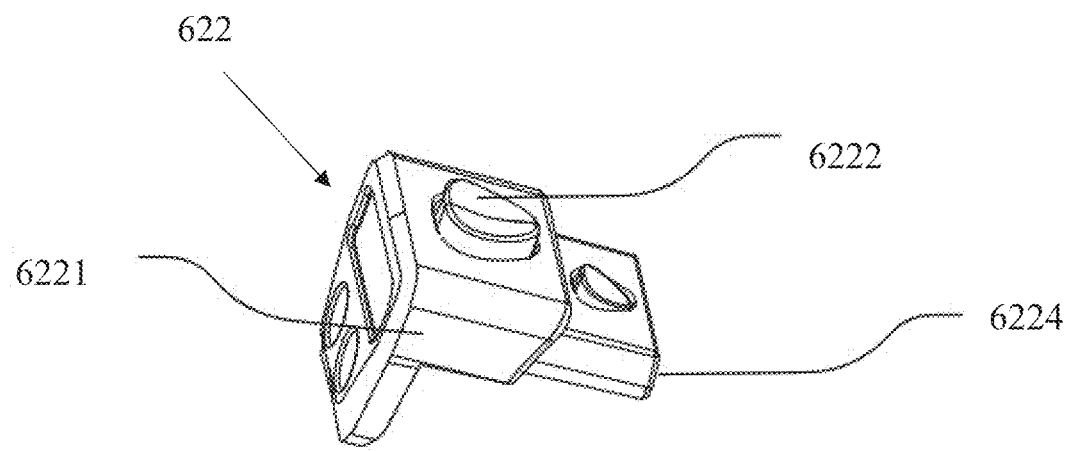
FIG. 17 is a schematic structure diagram of an embodiment of an elastic buckling structure of the present invention.

In the above, as shown in FIGS. 16 to 17, one of the first connection structure 111 and the second connection structure 621 is formed with a buckling opening 112 and the other one is provided with an elastic buckling structure 622 for snap-fitting to the buckling opening 112.

In this embodiment, the first connection structure 111 is provided on the lateral side portion of the stick 1, and the second connection structure 621 is provided on the light barrier board 60, and one of the first connection structure 111 and the second connection structure 621 is formed with the buckling opening 112, and the other one is provided with the elastic buckling structure 622 in snap-fitting with the buckling opening 112, and the buckling opening 112 and the elastic buckling structure 622 make the stick 1 and the light barrier board 60 detachably connected to thereby realize quick disassembly and assembly, which facilitates replacement and maintenance, and also make the entire lighting device compact in structure, and allowing separation of the light barrier board 60 and the stick 1 for easy storage and carrying.

Referring to FIGS. 15-18, the buckling opening 112 comprises an insertion opening 1121 and a positioning hole 1122, and the positioning hole 1122 is formed in the inside wall of the insertion opening 1121 and in communication with the insertion opening 1121. Specifically, the insertion opening 1121 extends inwardly from the outer surface of the side wall of the stick 1 in a first direction. The positioning hole 1122 extends from the inside wall of the insertion opening 1121 in a second direction. Preferably, the second direction is perpendicular to the first direction.

The elastic buckling structure 622 comprises an inserting member 6221, a positioning member 6222, and an elastic member 6223. The inserting member 6221 is used for insertion into and mating with the insertion opening 1121, and the positioning member 6222 is elastically connected by means of the elastic member 6223 to the inserting member 6221, and the positioning member 6222 is used to engage with the positioning hole 1122 as being acted upon by the elastic force of the elastic member 6223 when the inserting member 6221 is inserted in the insertion opening 1121 to thereby realize connection between the stick 1 and the light barrier board 60, providing an effect of preventing detaching, making the connection stable and reliable.

In some embodiments, the inserting member 6221 has a free end 6224.

When the inserting member 6221 is inserted into the insertion opening 1121, the free end 6224 is aligned with the insertion opening 1121 to guide the inserting member 6221 into the insertion opening 1121.

The positioning member 6222 is at least partly movably inserted into the inserting member 6221 and is connected to the elastic member 6223. The positioning member 6222 comprises a positioning portion 6225 and a releasing portion 6226, and the positioning portion 6225 and the releasing portion 6226 are arranged to space from each other in the direction in which the inserting member 6221 is inserted into the insertion opening 1121. The positioning portion 6225 is located between the free end 6224 of the inserting member 6221 and the releasing portion 6226.

The positioning portion 6225 is configured to extend out of the inserting member 6221 under the elastic acting force of the elastic member 6223 to engage with the positioning hole 1122, meaning by means of the acting force of the elastic member 6223, the positioning portion 6225 is kept in engagement with the positioning hole 1122 to enhance the stability of the connection between the stick 1 and the light barrier board 60.

The releasing portion 6226 is at least partly exposed outside of the inserting member 6221 to allow an external force to easily act on the releasing portion 6226, so as to overcome the elastic acting force of the elastic member 6223 to drive the positioning portion 6225 to move and thus disengage from the positioning hole 1122. The arrangement of the releasing portion 6226 is convenient for the user to carry out a pressing operation so as to fulfill disassembling of the light barrier board 60 and the stick 1. By arrangement of the releasing portion 6226 and the elastic member 6223, the operation can be done with one signal hand and the operation is easy and efficient.

Figure 18:
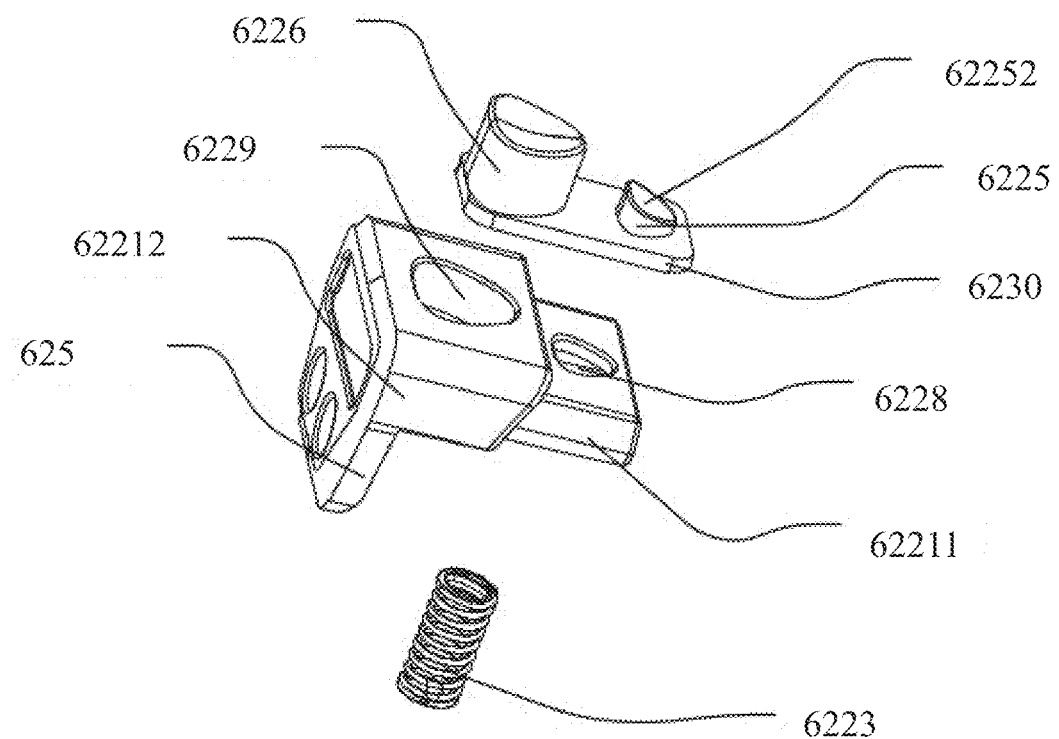
FIG. 18 is an exploded view showing am embodiment of an elastic buckling structure of the present invention.
Figure 19:
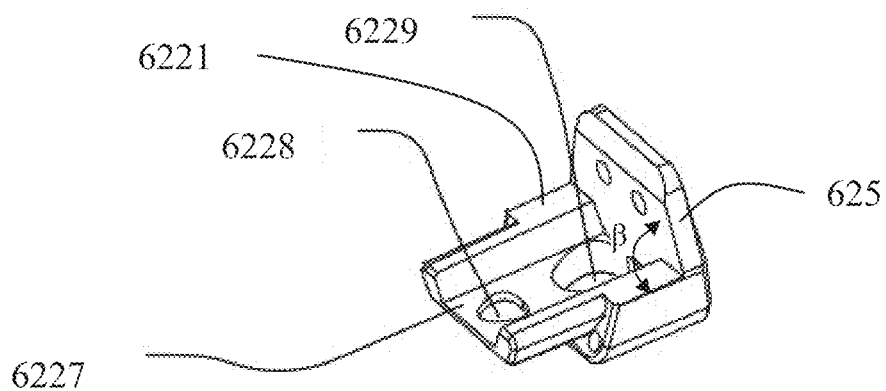
FIG. 19 is a schematic structure diagram of an embodiment of an inserting member of the present invention

Referring to FIGS. 17-19, the inserting member 6221 is formed with a first opening 6227, a second opening 6228, and a third opening 6229. The first opening 6227 extends from the free end 6224 of the inserting member 6221 into the interior of the inserting member 6221 in the direction in which the inserting member 6221 is inserted into the insertion opening 1121, for example Y direction. The second opening 6228 and the third opening 6229 are spaced from each other and separately extend from an outer side portion of the inserting member 6221 in a direction (for example: Z direction) perpendicular to the direction in which the inserting member 6221 is inserted into the insertion opening 1121 to the first opening 6227. The second opening 6228 is arranged between the free end 6224 of the inserting member 6221 and the third opening 6229 in the direction in which the inserting member 6221 is inserted into the insertion opening 1121.

In the present embodiment, the first opening 6227 is formed in the inserting member 6221 in such a manner that the central axis thereof is extended from one end of the inserting member 6221 to be parallel to the direction in which the inserting member 6221 is inserted into the insertion opening 1121, and the central axis of the second opening 6228 and the central axis of the third opening 6229 are both perpendicular to the central axis of the first opening 6227.

Specifically, the positioning portion 6225 is inserted in the second opening 6228 and movable relative to the second opening 6228 along the axial direction of the second opening 6228. The releasing portion 6226 is inserted in the third opening 6229 and movable relative to the third opening 6229 along the axial direction of the third opening 6229. The second opening 6228 and the third opening 6229 respectively function to maintain the moving directions of the positioning portion 6225 and the releasing portion 6226, namely respectively maintaining the positioning portion 6225 and the releasing portion 6226 to move in the direction perpendicular to the central axis of the first opening 6227, without tilting leftwards and rightwards.

In some embodiments, the positioning member 6222 also comprises a connecting portion 6230 that is received in the first opening 6227 and connected to the positioning portion 6225 and the releasing portion 6226. In the present embodiment, the connecting portion 6230 is of a plate-like structure and is arranged parallel to the first opening 6227. When the user presses the releasing portion 6226, the connecting portion 6230 is caused to move together with the releasing portion 6226 and the positioning portion 6225. That is, the connecting portion 6230, the releasing portion 6226 and the positioning portion 6225 can be driven by an external force to move in a synchronization manner. When the external force is removed, the elastic member 6223 restores toward its original position, the restoration force of the elastic member 6223 simultaneously pushes the connecting portion 6230, the positioning portion 6225, and the releasing portion 6226 to restore in position, so as to facilitate repeated operations.

In some embodiments, two opposite ends of the elastic member 6223 are respectively connected to the inside wall of the first opening 6227 and the releasing portion 6226. In the present embodiment, the elastic member 6223 adopts a helical spring, and the two opposite ends of the spring are respectively connected to the inside wall of the first opening 6227 and the releasing portion 6226. Specifically, the releasing portion 6226 has a hollow structure. One end of the helical spring is inserted into the inside of the releasing portion 6226. When the user presses the releasing portion 6226, the helical spring is caused to compress toward the inside wall of the first opening 6227, and when the user removes the external force from the releasing portion 6226, the helical spring restores and pushes the releasing portion 6226 to move away from the inside wall of the first opening 6227.

Of course, in other embodiments, the elastic member 6223 can be an elastic gasket, but no limitation is imposed here.

In summary, the present invention realizes automatic position restoration of the releasing portion 6226 and the positioning portion 6225 by using the elastic member 6223. The elastic member 6223 can maintain stable performance and restoring spring force, and the structure is compact and may save space.

Referring to FIG. 18 again, the inserting member 6221 comprises a first axle body 62211, a second axle body 62212, and a connecting plate 625. The second axle body 62212 is arranged between the first axle body 62211 and the connecting plate 625 in the direction in which the inserting member 6221 is inserted into the insertion opening 1121. The first axle body 62211 is configured to insert into and mate with the insertion opening 1121. The connecting plate 625 is used to connect with the light barrier board 60 or the stick 1. The first opening 6227 extends from the first axle body 62211 to the second axle body 62212. The second opening 6228 is formed in the first axle body 62211, and the third opening 6229 is formed in the second axle body 62212.

In some embodiments, the positioning portion 6225 comprises an inclined face 62252 away from the central axis of the inserting member 6221. The inclined face 62252 is extended as being inclined from one side thereof close to the free end 6224 of the inserting member 6221 in such a manner that the distance thereof from the central axis of the inserting member 6221 is gradually increased in a direction away from the free end 6224 of the inserting member 6221. The inclined face 62252 acts as a guiding surface to guide the positioning portion 6225 to enter into the positioning hole 1122. During the course of the inserting member 6221 being inserted into the insertion opening 1121, under an acting force of an inner top wall of the insertion opening 1121, the positioning member 6222 is forced to move in a direction toward an inner bottom wall of the insertion opening 1121, and the inclined face 62252 facilitates the positioning portion 6225 to engage into the positioning hole 1122.

Figure 20:
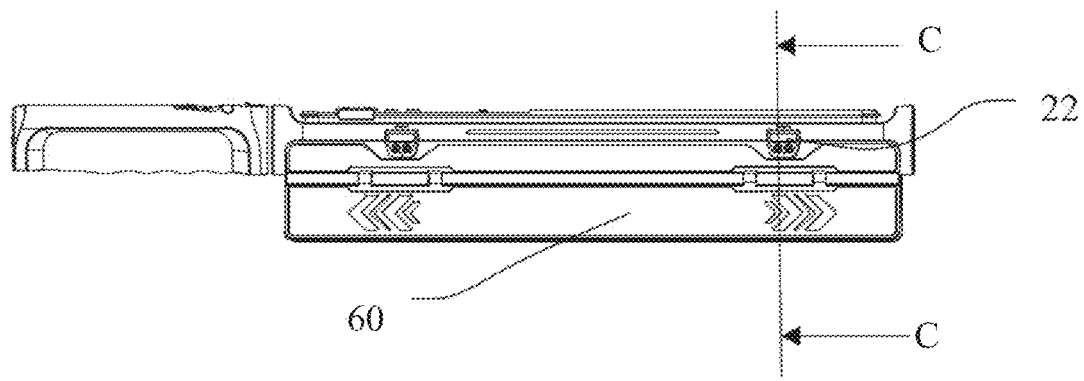
FIG. 20 is a schematic structure diagram showing an embodiment of a lighting device according to the present invention.
Figure 21:
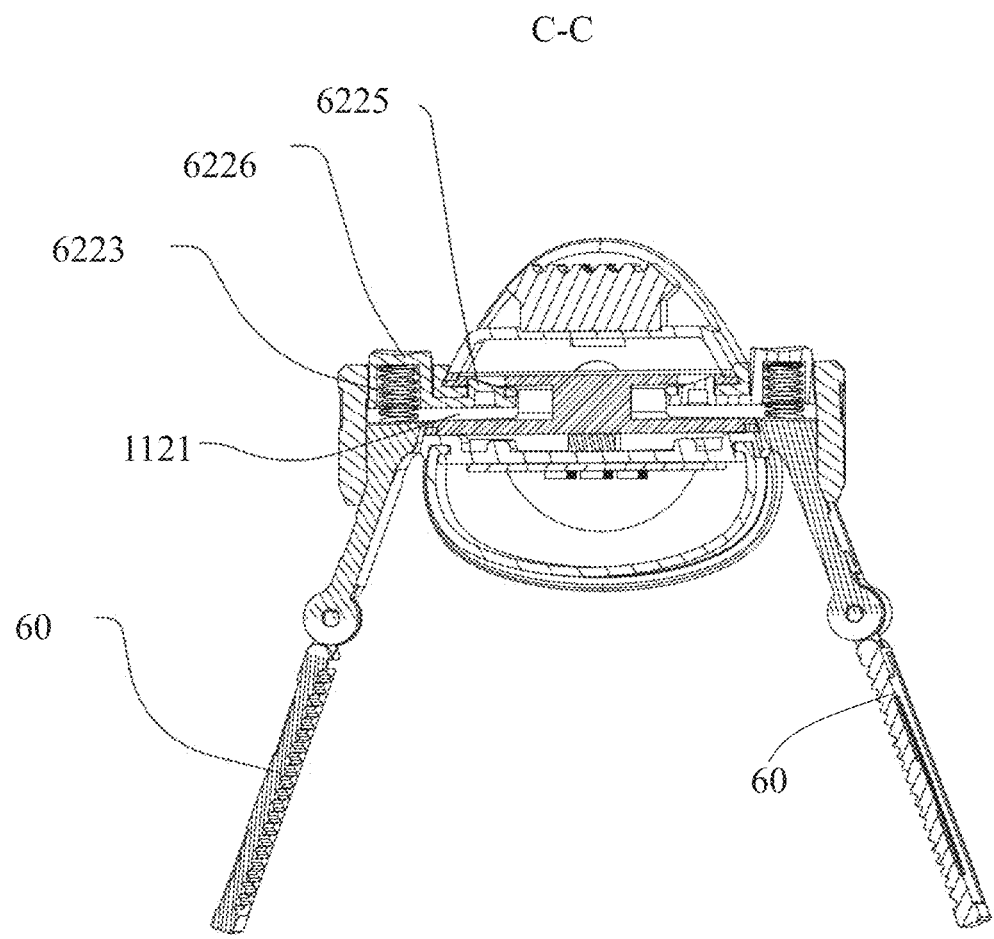
FIG. 21 is a cross-sectional view taken along line C-C of FIG. 20.

Referring to FIGS. 20 and 21, the principle of quick installation between the light barrier board 60 and the stick 1 is as follows:

The free end 6224 of the inserting member 6221 is set in alignment with the insertion opening 1121 to insert into the insertion opening 1121. The inclined face 62252 guides the positioning member 6222 to move downward during the course of insertion of the inserting member 6221, and the elastic member 6223 is in a compressed state. When the positioning portion 6225 of the positioning member 6222 becomes aligned with the positioning hole 1122, the positioning member 6222 is moved upwards under the action of the position restoration effect of the elastic member 6223, and the positioning portion 6225 get into engagement with the positioning hole 1122 to thereby connect the stick 1 and the light barrier board 60.

In the present invention, the principle of quick disassembly of the light barrier board 60 and the stick 1 is as follows:

The releasing portion 6226 can be pressed downwardly so as to drive the positioning member 6222 to move downwards to thereby disengage the positioning member 6222 from the insertion opening. Thus, the locking state of the stick 1 and the light barrier board 60 is released and the inserting member 6221 can be pulled out to realize the quick disassembly of the light barrier board 60 and the stick 1.

In the present embodiment, the first connection structure 111 comprises the buckling opening 112, and the second connection structure 621 comprises the elastic buckling structure 622, meaning the buckling opening 112 is arranged on the stick 1 and the elastic buckling structure 622 is arranged on the light barrier board 60. Of course, in other embodiments, the first connection structure 111 may comprise the elastic buckling structure 622 and the second connection structure 621 may comprise the buckling opening 112. The arrangement can be made according to actual situations, not limited to this.

Further, the elastic buckling structure 622 comprises the connecting plate 625 for connection with the light barrier board 60 and the inserting member 6221 which is inserted into the buckling opening 112. The connecting plate 625 is positioned on and mounted to one side surface of the light barrier board 60. The inserting member 6221 and the connecting plate 625 define an included angle β (see FIG. 19) that is greater than or equal to 80° and less than or equal to 100°, for example 90°, 919, 92°, 93°, 94°, 95°, so that a certain angle can be formed between the light barrier board 60 and the stick 1 to facilitate adjustment of a light blocking angle. Specifically, the included angle β is formed between adjacent planes of the connecting plate 625 and the second axle body 62212 of the inserting member 6221. Preferably, the bottom surfaces of the first and the second axle bodies 62211, 62212 of the inserting member 6221 are coplanar with each other.

In some embodiments, the lateral side portion of the stick 1 is provided with at least two first connection structures 111 arranged at intervals in the length direction thereof, i.e., X direction, and the light barrier board 60 is provided with at least two second connection structures 621 arranged at intervals in the length direction thereof. The second connection structures 621 are detachably connected to the first connection structures 111 in a one-to-one corresponding manner. In the present embodiment, as shown in FIG. 14, the stick 1 and the light barrier board 60 are detachably connected through two first connection structures 111 and two second connection structures 621 which are spaced from each other in the length direction of the stick 1, so as to improve the stability of the connection between the stick 1 and the light barrier board 60.

Of course, in other embodiments, the numbers of the first connection structure 111 and the second connection structure 621 can be three or more than three, no limitation being imposed here.

In some embodiments, the light barrier board 60 comprises at least two panel bodies 6200 which are arranged side by side in sequence, and any two adjacent ones of the panel bodies 6200 are rotatably connected, wherein one of the panel bodies 6200 is provided, on one side thereof that is away from the other one of the panel bodies 6200, with the second connection structure 621.

In the present embodiment, the two panel bodies 6200 can stay at any angle within a rotation angle range, and the two panel bodies 6200 may cooperate with each other to provide a good effect of lighting adjustment. It is noted that the number of the panel bodies 6200 can be 2, or can be more than 2, design being made according to the actual situations.

Figure 23:
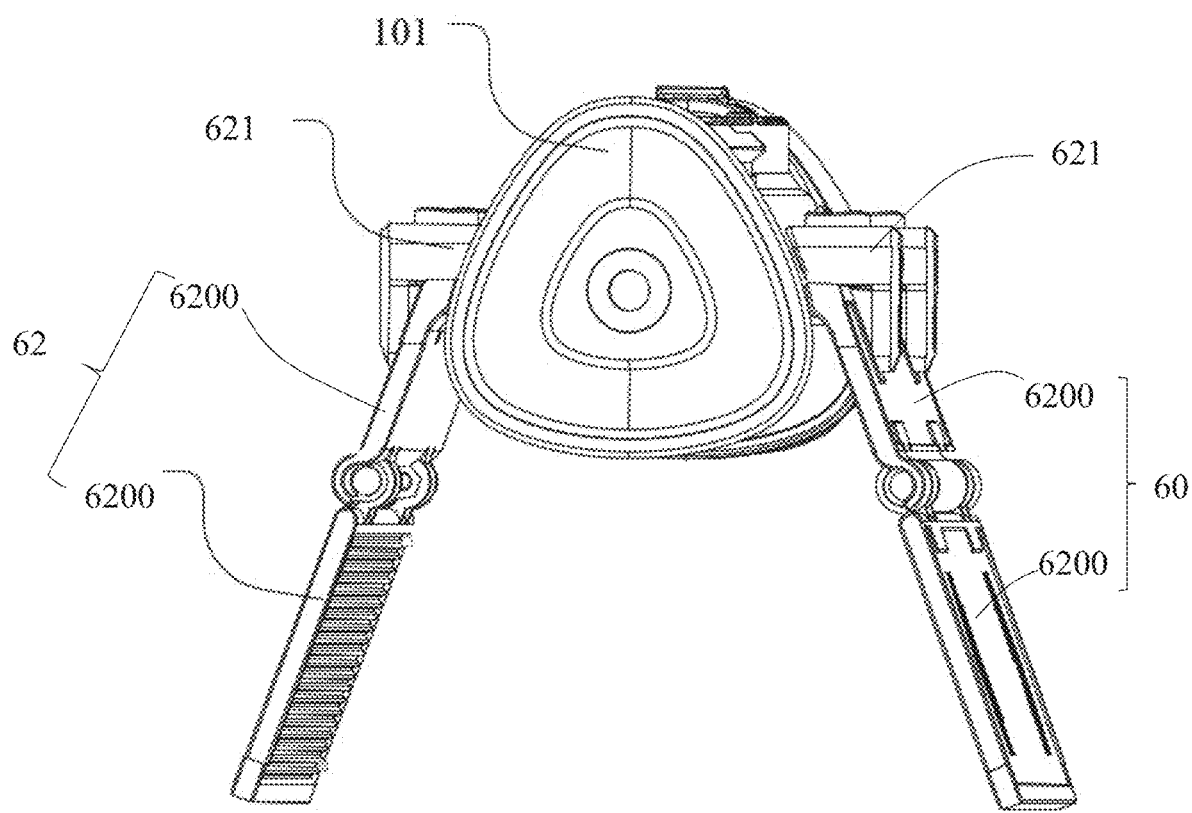
FIG. 23 is a schematic structure diagram showing connection of a light barrier board and a base according to another embodiment of the present invention.

In some embodiments, as shown in FIG. 23, the number of the light barrier board 60 is two. Two opposite lateral side portions of the stick 1 are each provided with at least one first connection structure 111. The two light barrier boards 60 are respectively and detachably connected to the two opposite lateral side portions of the stick 1 through cooperation of the second connection structure 621 with the first connection structure 111.

In the present embodiment, the two light barrier board 60 can stay at any angle within a rotation angle range to enclose and form a good effect of light blocking. The two light barrier boards 60 can be used in combination with each other to provide an excellent effect of lighting adjustment.

Figure 22:
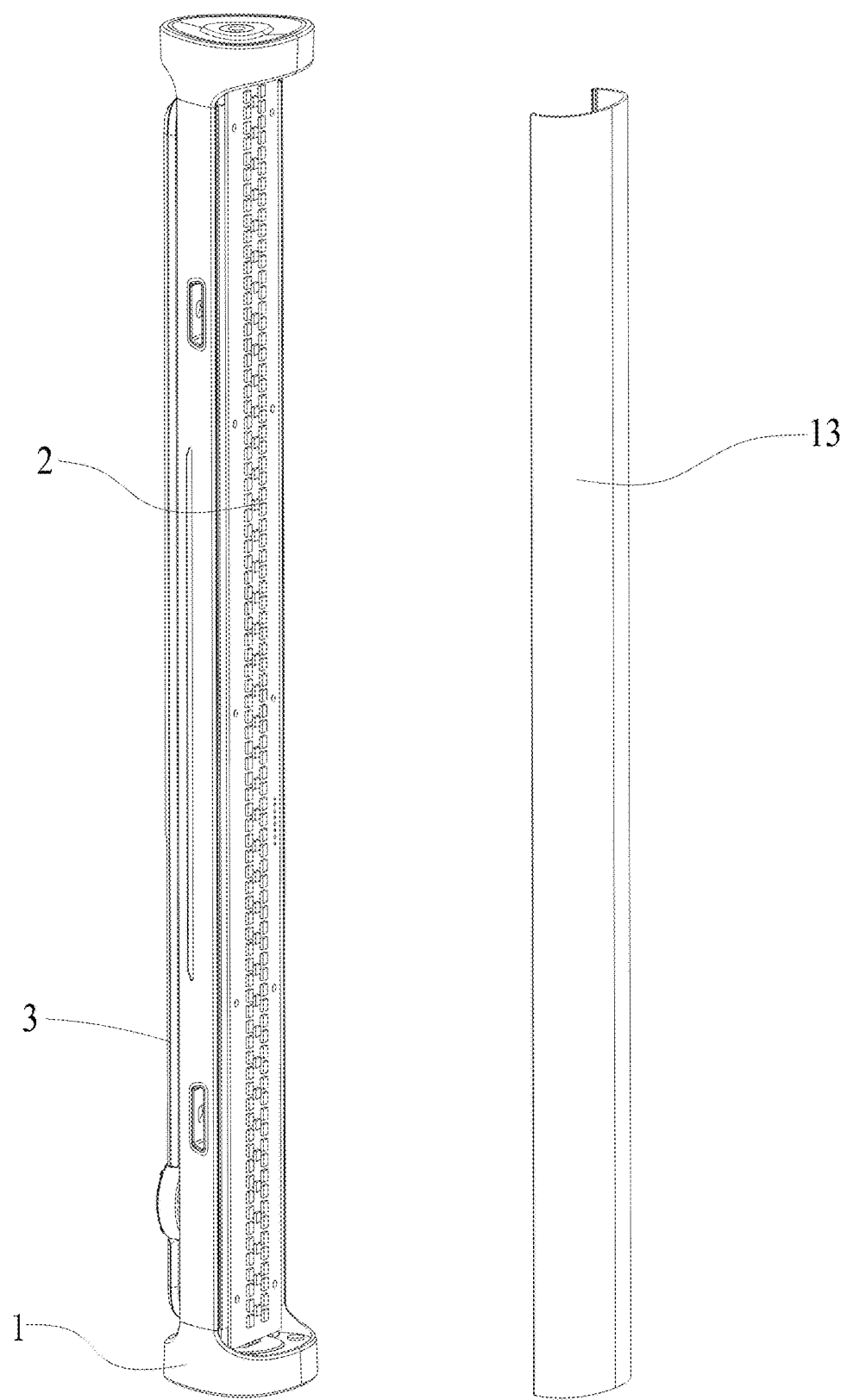
FIG. 22 is a partially-exploded schematic view of an embodiment of a light stick of the present invention.

Referring to FIGS. 14 and 22, the lighting device further comprises a light-emitting member 2 mounted on one surface of the stick 1, a panel mechanism 3 mounted on an opposite surface of the stick 1 and a transparent cover 13. The transparent cover 13 has a U-shaped configuration. Opposite sides of the transparent cover 13 are respectively secured to opposite side walls of the stick 1 to enclose and form an internal compartment. The light-emitting member 2 is arranged in the internal compartment and is used to emit light toward the transparent cover 13. The panel mechanism 3 comprises a control unit 32 configured to control the operation status of the light-emitting member 2.

In some embodiments, referring to FIG. 23, two opposite lateral side portions of the stick 1 are each provided with at least one first connection structure 111; and two light barrier boards 60 are respectively and detachably connected to the two lateral side portions of the stick 1, and the two light barrier boards 60 respectively extend from the two opposite lateral side portions of the stick 1 in a horn shape.

In some embodiments, the lighting device further comprises the handle 5, and one end of the handle 5 is detachably connected to one end of the stick 1 and is electrically connected to the stick 1. The user can decide whether to connect the handle 5 according to the actual situation. When the handle 5 is connected, the user can adjust the light filling angle of the lighting device by taking the handle 5 to achieve the optimal light filling effect and allow the user to easily make the adjustment.

In the present embodiment, the detachable connection between the handle 5 and the stick 1 can be a snap connection, a threaded connection. or a magnetic connection, and this can be set according to actual needs and is not limited to this.

In the present embodiment, the handle S can adopt a bar like structure, and its surface is provided with an arc-shaped groove that matches the palm of the human body, which is ergonomic and convenient for the user to take and hold comfortably. Of course, the handle 5 can also be in other shapes, such as a T-shape, but is not limited to this.

Further, the handle 5 is provided, in an interior thereof, with an electrical power source, and the stick 1 is provided with the light-emitting member 2, and the electrical power source is used to supply electrical power to the light-emitting member 2. In the present embodiment, the electrical power source can be a rechargeable battery, and the light-emitting member 2 can be a control circuit board and a plurality of LED lights electrically connected to the control circuit board. The rechargeable battery provides support of electrical power to the LED lights to enable the LED lights to emit light for light filling for the environment.

What is described above is only part or preferred embodiments of the present invention. Neither the text nor the drawings can therefore limit the scope of protection of the present invention. Equivalent structure transformations made using contents of the description and drawings of the present invention under the overall concept of the present invention, or direct/indirect application in other related technical fields are included in the scope of protection of the present invention.

The invention claimed is:

1. A lighting device, comprising:
a stick;
a light-emitting member arranged on the stick; and
a panel mechanism comprising a panel body and a control unit, the panel body being connected to the stick, the panel body comprising a first connection portion for connecting with external photographic equipment; the control unit being arranged on the panel body and electrically connected with the light-emitting member to control an operation status of the light-emitting member;
wherein the panel body comprises a top surface and a bottom surface that are opposite to each other, and a circumferential wall enclosing circumferences of the top surface and the bottom surface;
the control unit is arranged on the top surface, and the first connection portion protrudes outwards from the circumferential wall;
the top surface of the panel body is formed with a second connection portion for slidable connection with the external photographic equipment; and
the control unit is located at one end of the top surface of the panel body; and the second connection portion and the control unit are arranged to space from each other.

2. The lighting device according to claim 1, wherein the stick is in a configuration of an elongated bar which comprises a middle formed with a mounting surface for mounting the panel mechanism thereon.

3. The lighting device according to claim 2, wherein the middle of the stick further comprises a bottom surface opposite to the mounting surface;
the light-emitting member is mounted on the bottom surface of the stick; and
the lighting device further comprises a display screen arranged on the panel body, the display screen being arranged adjacent to the control unit and electrically connected to the light-emitting member for feeding back a status of the light-emitting member.

4. The lighting device according to claim 1, wherein the first connection portion comprises a first inclined surface extending outwards from the circumferential wall toward the top surface and a second inclined surface extending outwards from the top surface toward the bottom surface, the first inclined surface and the second inclined surface are connected to each other to form an included angle; or
the first connection portion surrounds entirety of the circumferential wall of the panel body.

5. The lighting device according to claim 1, wherein the second connection portion comprises a plurality of parallel slide grooves arranged at intervals or a plurality of first holes configured for connection with the external photographic equipment, the first holes extending from the top surface toward the bottom surface of the panel body.

6. The lighting device according to claim 5, wherein the panel body defines a second hole at the top surface; and
the control unit comprises at least one push knob received in the second hole, and one end of the push knob is exposed on the top surface and an opposite end of the push knob extends through the second hole into an interior of the stick to electrically connect to the light-emitting member; and the push knob is elastically connected to the stick.

7. The lighting device according to claim 6, wherein the control unit comprises a regulation knob, and the top surface of the panel body is recessed to form a receptable portion in which the regulation knob is received, a bottom wall of the receptable portion being formed with a third through hole, the third through hole communicating with the bottom surface; and
    one end the regulation knob protrudes out of the top surface, and an opposite end extends through the third through hole into the interior of the stick to electrically connect to the light-emitting member; and the regulation knob is rotatably connected to and/or elastically connected to the stick.

8. A lighting device, comprising:
a stick;
a light-emitting member arranged on the stick; and
a panel mechanism comprising a panel body and a control unit, the panel body being connected to the stick, the panel body comprising a first connection portion for connecting with external photographic equipment; the control unit being arranged on the panel body and electrically connected with the light-emitting member to control an operation status of the light-emitting member;
wherein the lighting device further comprises a handle, one end of one of the stick and the handle is provided with a guide pillar, and an outside wall of the guide pillar is provided with a first electrical conduction member; and
one end of another one of the stick and the handle is formed with an insertion aperture, and an inside wall of the insertion aperture is provided with a second electrical conduction member, the first electrical conduction member being used to contact with the second electrical conduction member when the guide pillar is inserted into the insertion aperture in order to form an electrical connection between the stick and the handle.

9. The lighting device according to claim 8, wherein an insertion trough is formed around the guide pillar, an inside wall of the insertion trough being recessed to form a retention slot and a guide notch, the guide notch extending from an opening of the insertion trough in an axial direction of the insertion trough to one end of the retention slot and communicating with the retention slot, the retention slot extending from one end of the guide notch that is away from the opening of the insertion trough in a circumferential direction of the insertion trough;
    said one end of another one of the stick and the handle is provided with an insertion pole, the insertion pole being configured for insertion into and mating with the insertion trough, a lug protruding outwardly from an outside wall of the insertion pole, the insertion aperture being defined in the insertion pole; and
    the stick and the handle are detachably connected through a rotary connection between the lug and the retention slot.

10. The lighting device according to claim 9, wherein the insertion aperture and the guide pillar are coaxial with each other.

11. The lighting device according to claim 10, wherein the light-emitting member is arranged on the stick, and an electrical power source is arranged on the handle, the light-emitting member being electrically connected with one of the first electrical conduction member and the second electrical conduction member, the electrical power source being electrically connected with another one of the first electrical conduction member and the second electrical conduction member, electrical connection being formed between the light-emitting member and the electrical power source by means of contact between the first electrical conduction member and the second electrical conduction member.

12. The lighting device according to claim 11, wherein one of the first electrical conduction member and the second electrical conduction member is an electrically conductive plate that is arranged in a fixed manner, and another one is an electrically conductive plate that is elastically stretchable; and/or
    the numbers of the first electrical conduction member and the second electrical conduction member are both multiple, the multiple first electrical conduction members being arranged at intervals in a circumferential direction of the guide pillar, the multiple second electrical conduction members being arranged at intervals in a circumferential direction of the insertion opening, the multiple second electrical conduction members and the multiple first electrical conduction members being arranged to correspond to each other in a one-to-one manner.

13. The lighting device according to claim 9, wherein one of the stick and the handle is further provided with a locking hole, another one is provided with a locking tongue, an unlocking control component, and an elastic returning member;
    the locking tongue is configured to insert into the locking hole when the lug is set in rotary connection with the retention slot so as to prevent the lug from being rotated out of the retention slot;
    the unlocking control component is drivingly connected with the locking tongue in order to, when an acting force being exerted on, pull the locking tongue out of the locking hole to allow the lug to rotate out of the retention slot; and
    the elastic returning member is configured for exerting an elastic force on the locking tongue to push the locking tongue to insert into the locking hole after the acting force is removed from the unlocking control component.

14. A lighting device, comprising:
a stick;
a light-emitting member arranged on the stick; and
a panel mechanism comprising a panel body and a control unit, the panel body being connected to the stick, the panel body comprising a first connection portion for connecting with external photographic equipment; the control unit being arranged on the panel body and electrically connected with the light-emitting member to control an operation status of the light-emitting member;
wherein the lighting device further comprises a light barrier board configured for blocking a portion of light emitted by the light-emitting member, and a lateral side portion of the stick is provided with a first connection structure, and the light barrier board is provided with a second connection structure, the light barrier board being detachably connected by means of the second connection structure cooperating with the first connection structure.

15. The lighting device according to claim 14, wherein one of the first connection structure and the second connection structure comprises a buckling opening, and another one of the first connection structure and the second connection structure comprises an elastic buckling structure for snap-fitting to the buckling opening;
    the buckling opening comprises an insertion opening and a positioning hole, and the positioning hole is formed in an inside wall of the insertion opening and in communication with the insertion opening; and the elastic buckling structure comprises an inserting member, a positioning member, and an elastic member;

wherein the inserting member is used for insertion into the insertion opening, and the positioning member is elastically connected by means of the elastic member to the inserting member, and the positioning member is used to engage with the positioning hole as being acted upon by the elastic force of the elastic member when the inserting member is inserted in the insertion opening.

16. The lighting device according to claim 15, wherein the inserting member has a free end, and the inserting member is inserted into the insertion opening in such a manner as to have the free end aligned with the insertion opening;

the positioning member is at least partly movably inserted into the inserting member and is connected to the elastic member, and the positioning member comprises a positioning portion and a releasing portion, and the positioning portion and the releasing portion are arranged to space from each other in a direction in which the inserting member is inserted into the insertion opening, and the positioning portion is located between the free end of the inserting member and the releasing portion;

the positioning portion is configured to extend out of the inserting member under action of an elastic force of the elastic member to get engagement with the positioning hole; and the releasing portion is at least partly exposed outside of the inserting member in order to overcome the elastic force of the elastic member as being acted upon by an external force to drive the positioning portion to move and disengage from the positioning hole.

17. The lighting device according to claim 15, wherein the elastic buckling structure comprises a connecting plate for connection with the light barrier board and the inserting member, the connecting plate being positioned on and mounted to one side surface of the light barrier board, the inserting member and the connecting plate defining an included angle that is greater than or equal to 80° and less than or equal to 100°.

18. The lighting device according to claim 14, wherein two said light barrier boards are provided, and two opposite lateral side portions of the stick are each provided with at least one said first connection structure; and the two light barrier boards are respectively and detachably connected to the two lateral side portions of the stick through cooperation of the second connection structures with the first connection structures.

* * * * *